US008793733B2

(12) United States Patent
Murakoshi

(10) Patent No.: US 8,793,733 B2
(45) Date of Patent: Jul. 29, 2014

(54) INFORMATION PROCESSING APPARATUS, INFORMATION PROCESSING METHOD, AND PROGRAM FOR ENABLING COMPUTER TO EXECUTE SAME METHOD

(75) Inventor: Sho Murakoshi, Tokyo (JP)

(73) Assignee: Sony Corporation (JP)

( * ) Notice: Subject to any disclaimer, the term of this patent is extended or adjusted under 35 U.S.C. 154(b) by 1241 days.

(21) Appl. No.: 11/435,387

(22) Filed: May 16, 2006

(65) Prior Publication Data

US 2006/0269258 A1 Nov. 30, 2006

(30) Foreign Application Priority Data

May 31, 2005 (JP) ................................. 2005-158333

(51) Int. Cl.
*H04N 5/445* (2011.01)
*G06F 3/00* (2006.01)
*G06F 13/00* (2006.01)

(52) U.S. Cl.
USPC .......................................................... 725/46

(58) Field of Classification Search
USPC ........ 725/34–35, 39–61, 38, 86, 93; 386/125, 386/260; 707/3; 715/203
See application file for complete search history.

(56) References Cited

U.S. PATENT DOCUMENTS

| 5,703,795 | A * | 12/1997 | Mankovitz ................... 715/721 |
| 5,880,768 | A * | 3/1999 | Lemmons et al. ............. 725/41 |
| 6,348,910 | B1 * | 2/2002 | Yamamoto et al. .......... 345/102 |
| 6,754,271 | B1 * | 6/2004 | Gordon et al. ............... 725/138 |
| 6,774,926 | B1 * | 8/2004 | Ellis et al. .................. 348/14.01 |
| 6,934,964 | B1 * | 8/2005 | Schaffer et al. ............... 725/46 |
| 7,088,952 | B1 * | 8/2006 | Saito et al. .................. 455/3.06 |
| 7,337,394 | B2 * | 2/2008 | Nitta et al. ................... 715/210 |
| 7,509,662 | B2 * | 3/2009 | Kamen ........................ 725/46 |
| 7,849,393 | B1 * | 12/2010 | Hendricks et al. ............ 715/203 |
| 2002/0116709 | A1 * | 8/2002 | Sakamoto et al. .............. 725/41 |
| 2003/0002862 | A1 * | 1/2003 | Rodriguez et al. ........... 386/125 |
| 2003/0061201 | A1 * | 3/2003 | Grefenstette et al. ........... 707/3 |
| 2003/0067554 | A1 * | 4/2003 | Klarfeld et al. .............. 348/461 |
| 2003/0093790 | A1 * | 5/2003 | Logan et al. .................. 725/38 |
| 2003/0146940 | A1 * | 8/2003 | Ellis et al. ................... 345/811 |
| 2003/0158910 | A1 * | 8/2003 | Toyouchi et al. ............. 709/218 |
| 2003/0236776 | A1 * | 12/2003 | Nishimura et al. .............. 707/3 |

(Continued)

FOREIGN PATENT DOCUMENTS

| JP | 2000-285243 A | 10/2000 |
| JP | 2000-295554 A | 10/2000 |
| JP | 2002-152639 A | 5/2002 |
| JP | 2002-199293 A | 7/2002 |
| JP | 2002-344852 A | 11/2002 |
| JP | 2002-344872 A | 11/2002 |
| JP | 2003-114903 A | 4/2003 |
| JP | 2003-274298 A | 9/2003 |
| JP | 2003-348468 A | 12/2003 |
| JP | 2004-056631 A | 2/2004 |
| JP | 2004-127128 A | 4/2004 |
| JP | 2005-065185 A | 3/2005 |

*Primary Examiner* — Nasser Goodarzi
*Assistant Examiner* — An Nguyen
(74) *Attorney, Agent, or Firm* — Lerner, David, Littenberg, Krumholz & Mentlik, LLP

(57) ABSTRACT

An information processing apparatus includes a content information storage section configured to store content information for specifying content; a content information providing section configured to provide the content information; a recommended content information providing section configured to select and provide the recommended content information; an operation signal receiving section configured to receive an operation signal for the information processing apparatus; a content providing section configured to obtain and provide content corresponding to the content information or content corresponding to the recommended content information; a mode holding section configured to hold information indicating which one of a user-driven mode and an apparatus-driven mode for selecting the content an operation mode is set to; and a display control section configured to control display of the content information, the recommended content information, or the content provided from the content providing section on the basis of information about the mode.

2 Claims, 19 Drawing Sheets

(56) References Cited

U.S. PATENT DOCUMENTS

| | | | |
|---|---|---|---|
| 2004/0013409 A1* | 1/2004 | Beach et al. | 386/83 |
| 2004/0210932 A1* | 10/2004 | Mori et al. | 725/39 |
| 2004/0255325 A1* | 12/2004 | Furui et al. | 725/61 |
| 2005/0028204 A1* | 2/2005 | Nakamura et al. | 725/45 |
| 2005/0122863 A1* | 6/2005 | Kudo | 369/47.23 |
| 2005/0160465 A1* | 7/2005 | Walker | 725/86 |
| 2006/0263047 A1* | 11/2006 | Nagao et al. | 386/95 |

\* cited by examiner

FIG. 6
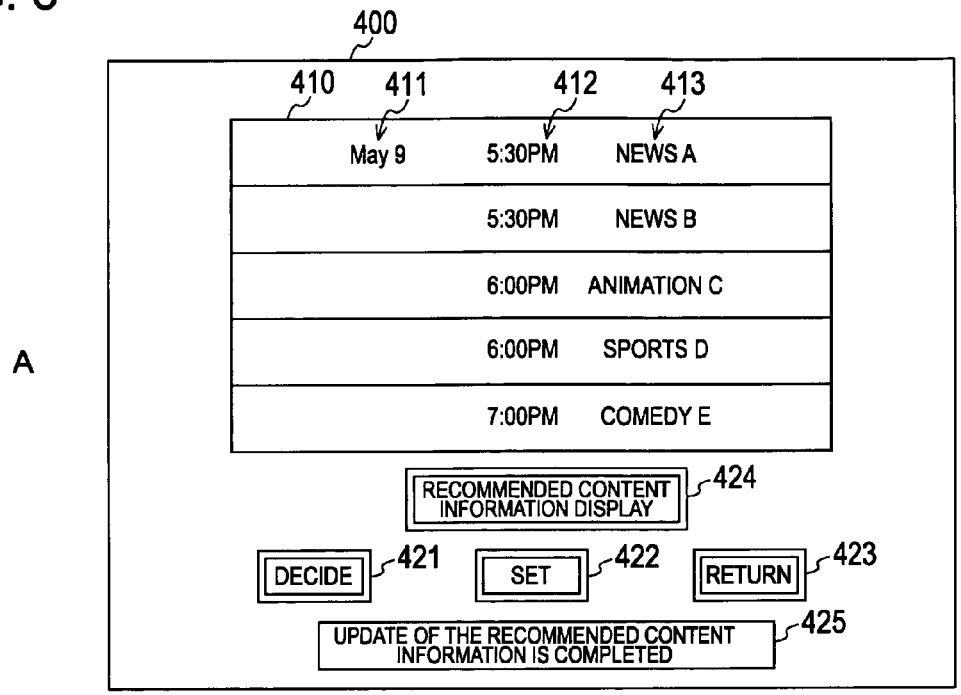
A
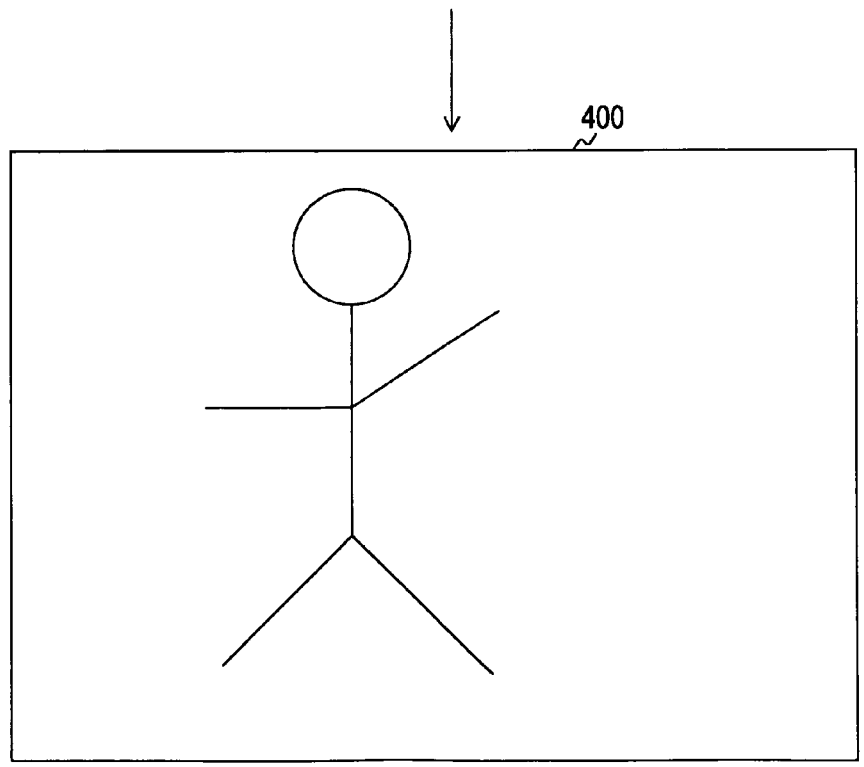
B

FIG. 8
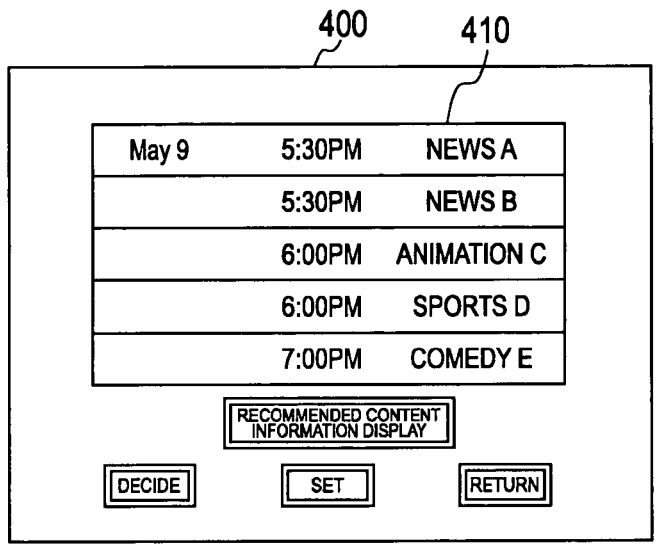
NO OPERATION FOR A FIXED TIME
USER-DRIVEN MODE / APPARATUS-DRIVEN MODE
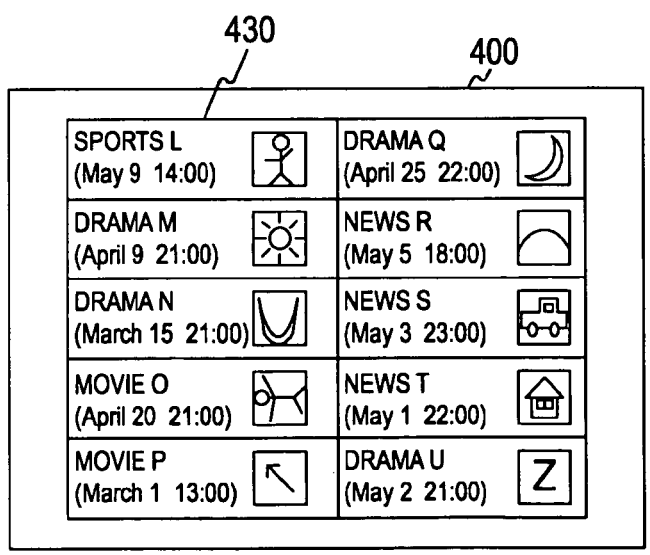

FIG. 10
CONTENT INFORMATION LIST DISPLAY AT
ANOTHER RECORDING DATE AND TIME
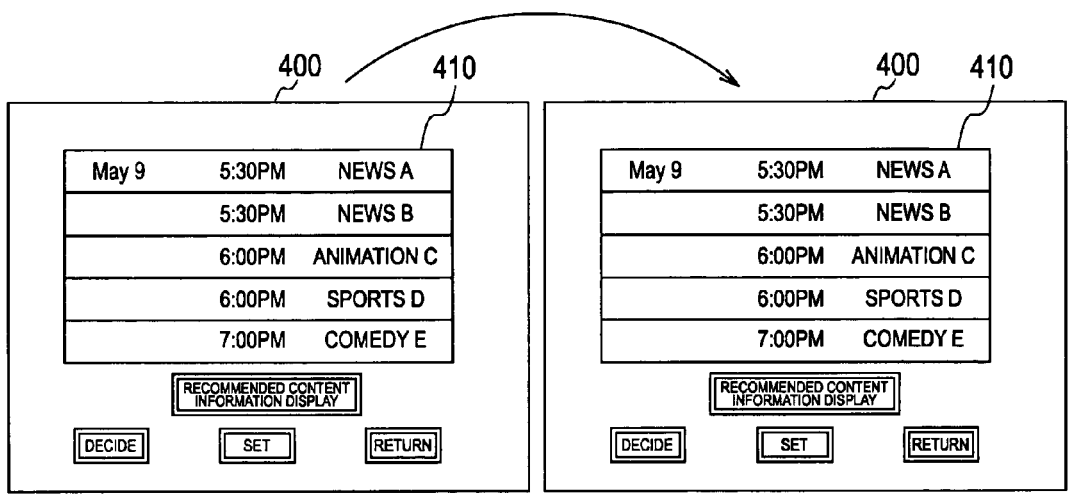
CONTENT INFORMATION LIST DISPLAY AT
ANOTHER RECORDING DATE AND TIME
NUMBER OF OCCURRENCES IS EXCEEDED
USER-DRIVEN MODE
APPARATUS-DRIVEN MODE
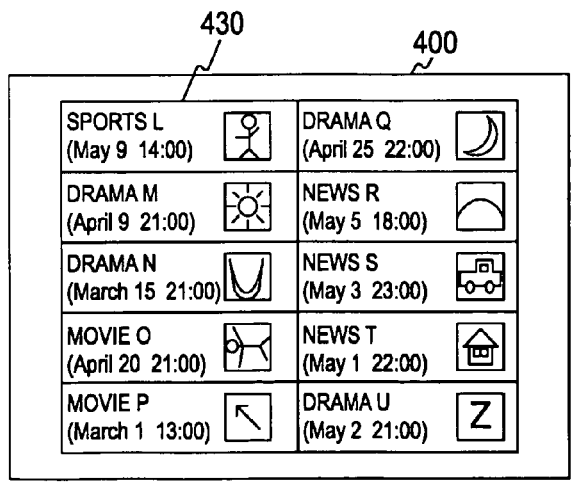

FIG. 11
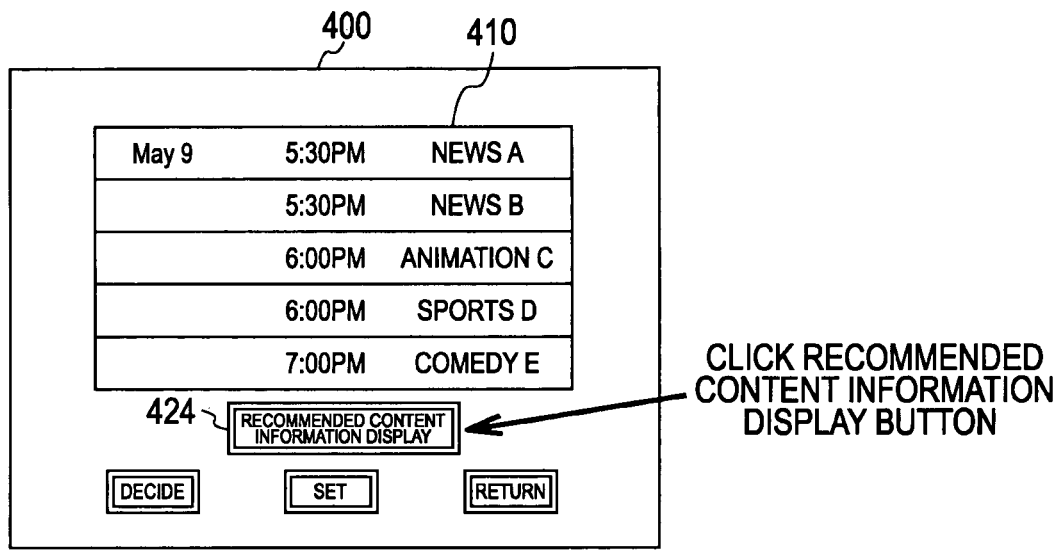
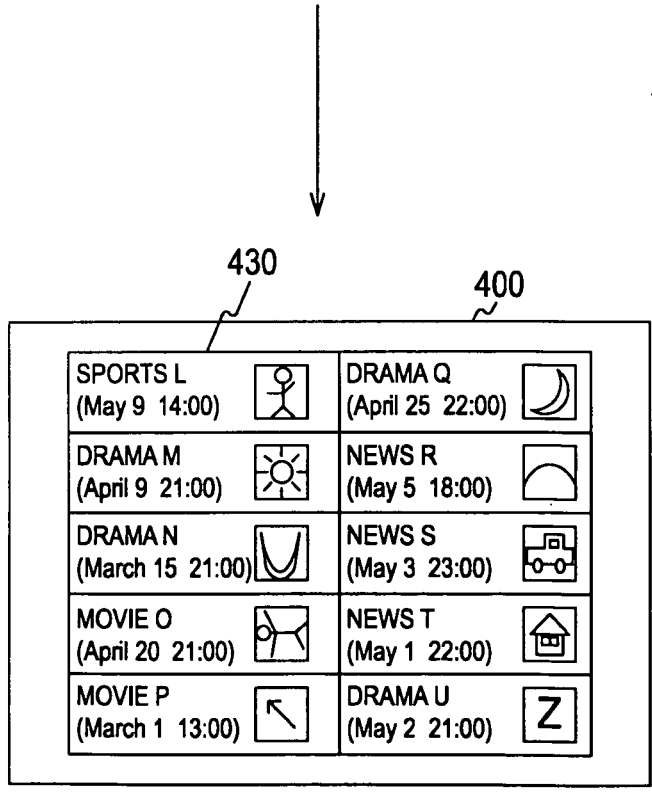

FIG. 16

| May 2005: SECOND WEEK | ... | 18:00 TO 20:00 | 20:00 TO 22:00 | 22:00 TO 24:00 |
|---|---|---|---|---|
| May 9 (MON.) | ... | NEWS A (FOR May 8) DRAMA B (FOR May 5) | MOVIE C (FOR May 4) | NONE |
| May 10 (TUE.) | ... | NEWS A (FOR May 9) | DRAMA D (FOR May 3) | NEWS F (FOR May 9) |
| May 11 (WED.) | ... | NEWS G (FOR May 9) | DRAMA H (FOR May 10) | NEWS F (FOR May 10) |
| May 12 (THU.) | ... | NEWS G (FOR May 10) | DRAMA H (FOR April 26) | NEWS F (FOR May 11) |
| May 13 (FRI.) | ... | NEWS G (FOR May 11) | COMEDY K (FOR May 1) | MOVIE J (FOR April 15) |
| May 14 (SAT.) | ... | NONE | COMEDY K (FOR May 1) | NONE |
| May 15 (SUN.) | ... | MOVIE C (FOR May 4) | DRAMA M (FOR May 1) DRAMA M (FOR May 8) | NONE |

| START FRAME No. | END FRAME No. | SUBTITLES AREA No. | NUMBER OF DETECTED MACRO BLOCKS |
|---|---|---|---|
| 350 | 450 | 3 | 210 |
| 600 | 750 | 3 | 310 |
| 1000 | 1250 | 3 | 250 |
| ⋮ | ⋮ | ⋮ | ⋮ |

INFORMATION PROCESSING APPARATUS, INFORMATION PROCESSING METHOD, AND PROGRAM FOR ENABLING COMPUTER TO EXECUTE SAME METHOD

CROSS-REFERENCE TO RELATED APPLICATIONS

The present application claims priority from Japanese Patent Application No. JP 2005-158333 filed on May 31, 2005, the disclosure of which is hereby incorporated by reference herein.

BACKGROUND OF THE INVENTION

The present invention relates to an information processing apparatus for presenting information of stored content. More particularly, the present invention relates to an information processing apparatus for switching between information of content created in response to a request from a user and information of content created by the information processing apparatus at a predetermined timing and for displaying the information, to an information processing method for use therewith, and to a program for enabling a computer to execute the information processing method.

In related art, CE (Consumer Electronics) devices are under the control of a user and perform predetermined operation as a result of the user performing some kind of operation. For example, when schedule recording of broadcast content to be transmitted from a broadcast station in a CE device is to be performed, the user performs detailed setting of a channel, a recording start time, a recording end time, and the like, and the CE device performs recording as is set. Furthermore, when a piece of music of a specific genre (for example, healing music) is desired to be played back, the user selects and plays back the piece of music of that genre.

However, in recent years, CE devices that make a decision and operate even if a user does not perform detailed setting have appeared. In some CE devices, for example, the user specifies information such as the genre of a program to be scheduled and recorded, performers thereof, and a time zone thereof, and the program is program-recorded on the basis of the specified conditions (refer to, for example, Japanese Unexamined Patent Application Publication No. 2000-295554 (FIG. 1)) some CE devices determine the order in which recorded broadcast content is to be played back. Furthermore, in some CE devices, pieces of music are divided by genre (for example, healing music) appropriate for the feeling of the user, and content such as a piece of music matching the request from the user is played back. It is expected that, as a technology is further developed, CE devices that operate without the need for the user to operate will appear in the future.

SUMMARY OF THE INVENTION

However, when the CE device makes a decision and records broadcast content in the manner described above, it is not that only the broadcast content desired by the user is recorded although the CE device makes a decision and records broadcast content. Therefore, the amount of broadcast content that is stored in the CE device may become enormous. For this reason, the user is likely to take considerable time and effort to find target broadcast content. In this case, if information of content selected by the CE device from within the recorded content can be provided to the user, this is convenient for the user.

However, at present, it is difficult to say that the concept that CE devices are under the control of the user is wiped away from the viewpoint of the image of the user. Under such circumstances, when information of content that is determined and recorded by the CE device in the manner described above is provided to the user, there is a possibility that the user mistakenly thinks that the CE device fails and becomes not controlled. Therefore, it is necessary to switch between a state that is under the control of the user and a state that is not under the control of the user so that the user does not mistakenly think that the CE device fails and becomes not controlled.

It is desirable to provide an information processing apparatus for determining and selecting information of broadcast content that should be provided to a user from among an enormous number of stored broadcast content and for providing the selected broadcast content to the user without an uncomfortable feeling.

According to an embodiment of the present invention, there is provided an information processing apparatus including: content information storage means for storing content information for specifying content; content information providing means for providing the content information; recommended content information providing means for selecting, as recommended content information, content information of the content to be recommended from the content information storage means in accordance with predetermined conditions and for providing the recommended content information; operation signal receiving means for receiving an operation signal for the information processing apparatus; content providing means for obtaining and providing content corresponding to the content information or content corresponding to the recommended content information in response to the operation signal; mode holding means for, in response to the operation signal, holding information indicating which one of a user-driven mode for selecting the content on the basis of the content information and an apparatus-driven mode for selecting the content on the basis of the recommended content information an operation mode is set to; and display control means for controlling display of the content information, the recommended content information, or the content provided from the content providing means on the basis of information about the mode. This brings about the effect that, in response to an operation signal, content information is selected and displayed in the user-driven mode, and recommended content information is selected and displayed in the apparatus-driven mode.

In the embodiment of the present invention, the mode holding means may include: flag holding means for holding a flag indicating one of the apparatus-driven mode and the user-driven mode; apparatus-driven mode shift determination means for determining whether or not the operation mode should shift to the apparatus-driven mode in response to the operation signal and for setting the apparatus-driven mode into the flag when it is determined that the operation mode should shift to the apparatus-driven mode; and user-driven mode shift determination means for determining whether or not the operation mode should shift to the user-driven mode in response to the operation signal and for setting the user-driven mode into the flag when it is determined that the operation mode should shift to the user-driven mode. This brings about the effect that information about a mode, in which the operation mode should shift to the user-driven mode or to the apparatus-driven mode in response to an operation signal, is supplied via the flag.

The apparatus-driven mode shift determination means may determine whether or not the operation mode should shift to the apparatus-driven mode on the basis of the number of receptions of the operation signal. This brings about the effect that it is determined whether or not the operation mode should shift to the apparatus-driven mode on the basis of the number of receptions of the operation signal.

The apparatus-driven mode shift determination means may determine that the operation mode should shift to the apparatus-driven mode when the operation signal for displaying the content for a predetermined number of times within a predetermined time in the user-driven mode is received. This brings about the effect that it is determined whether or not the operation mode should shift to the apparatus-driven mode on the basis of the number of playbacks of content.

The apparatus-driven mode shift determination means may determine that the operation mode should shift to the apparatus-driven mode when the operation signal for referring to an area in which the content information is stored for a predetermined number of times within a predetermined time in the user-driven mode is received. This brings about the effect that it is determined whether or not the operation mode should shift to the apparatus-driven mode on the basis of the number of references to the area where content information is stored.

The mode holding means may include: flag holding means for holding a flag indicating one of the apparatus-driven mode and the user-driven mode; and a flag setting timer for setting the apparatus-driven mode into the flag when a state in which the operation signal is not received continues for a predetermined time. This brings about the effect that, when a state in which the operation signal is not received continues for a predetermined time, the operation mode shifts to the apparatus-driven mode. That is, the operation mode shifts to the apparatus-driven mode at the same timing as that of a screen saver.

The flag setting timer may set the user-driven mode into the flag after a predetermined time has passed since the setting of the apparatus-driven mode is performed. This brings about the effect that the operation mode shifts to the user-driven mode after a predetermined time since the operation mode shifted to the apparatus-driven mode.

The flag setting timer may alternately set the flag to the apparatus-driven mode and to the user-driven mode at predetermined intervals after the setting is performed. This brings about the effect that the operation mode shifts to the apparatus-driven mode and to the user-driven mode at predetermined intervals.

In the embodiment of the present invention, the display control means may display the content information or the content in the case of the user-driven mode and may display the recommended content information in the case of the apparatus-driven mode. This brings about the effect that content information or content is displayed in the user-driven mode, and recommended content information is displayed in the apparatus-driven mode.

In the embodiment of the present invention, the recommended content information providing means may include: recommended content information selection means for selecting, as the recommended content information, the content information of the content to be recommended from the content information storage means in accordance with predetermined conditions; recommended content information storage means for storing the recommended content information; and recommended content information processing means for processing the recommended content information so as to be displayed in a predetermined format and for supplying the recommended content information. This brings about the effect that content information that should be recommended under predetermined conditions is selected from content information, and the selected content information that should be recommended is processed and displayed in a predetermined format.

The recommended content information selection means may update the recommended content information at predetermined intervals. This brings about the effect that the recommended content information is updated.

The recommended content information selection means may update the recommended content information each time the content information is added to the content information storage means. This brings about the effect that each time content information is added to the content information storage means, the recommended content information is updated.

The information processing apparatus may further include information update report means for reporting the fact that the update has been performed. This brings about the effect that each time recommended content information is updated, this fact is reported.

The display control means may display the fact that the update has been performed when the report is made from the information update report means. This brings about the effect that the user recognizes the fact that the update of the recommended content information has been performed.

The display control means may display the updated recommended content information when the report is made from the information update report means. This brings about the effect that, when the recommended content information is updated, the content thereof is immediately displayed.

The recommended content information processing means may perform processing so that a thumbnail created on the basis of the content corresponding to the recommended content information and a title of the content corresponding to the recommended content information are displayed in the predetermined format of the recommended content information. This brings about the effect that the title of the recommended content information and a scene of the recommended content information are displayed as thumbnails. It becomes easy for the user to recognize the content of the recommended content information by viewing the title of the recommended content information and the thumbnails created on the basis of and the content corresponding to the recommended content information.

The recommended content information processing means may perform processing so that a plurality of predetermined formats of the recommended content information are displayed. This brings about the effect that a plurality of pieces of recommended content information are displayed at one time.

The recommended content information processing means may perform processing so that, in the creation of the thumbnail, a plurality of predetermined scenes of the content corresponding to the recommended content information are selected to create a plurality of thumbnails, and the thumbnails are displayed in such a manner as to be arranged. This brings about the effect that the title of the content corresponding to the recommended content information, and a plurality of thumbnails created on the basis of the content corresponding to the recommended content information are displayed as the recommended content information. As a result of displaying a plurality of thumbnails created on the basis of the content corresponding to the recommended content information, it is possible to allow the user to easily recognize the content corresponding to the recommended content information.

The recommended content information selection means may select, as the recommended content information, the content information of the content that should be recommended from the content information storage means on the basis of a viewing history of the user with respect to the content. This brings about the effect that the recommended content information appropriate for the user is selected.

The recommended content information selection means may select, as the recommended content information, the content information of the content that should be recommended from the content information storage means on the basis of a viewing history of the user with respect to the content in a specific time zone. This brings about the effect that recommended content information is selected on the basis of information, such as content that is frequently viewed by the user or content that is less frequently viewed by the user in a specific time zone.

The recommended content information selection means may select, as the recommended content information, the content information of the content that should be recommended from the content information storage means on the basis of a viewing history of the user with respect to the content in a specific day of the week. This brings about the effect that recommended content information is selected on the basis of information, such as content that is frequently viewed by the user or content that is less frequently viewed by the user in a specific day of the week.

The recommended content information selection means may select, as the recommended content information, the content information of the content that should be recommended from the content information storage means on the basis of predetermined feature data about audio data or image data contained in the content. This brings about the effect that recommended content information is selected on the basis of feature data about audio data or image data.

According to another embodiment of the present invention, there is provided an information processing apparatus including: content information storage means for storing content information for specifying content; content information providing means for providing the content information; recommended content information providing means for selecting, as recommended content information, content information of the content that should be recommended from the content information storage means in accordance with predetermined conditions and for providing the recommended content information; operation means for, in response to a request, selecting content corresponding to the content information or content corresponding to the recommended content information; content providing means for obtaining and providing content corresponding to the content information or content corresponding to the recommended content information, the content information or the recommended content information being selected by the operation means; mode holding means for holding information indicating which one of a user-driven mode for selecting the content on the basis of the content information and an apparatus-driven mode for selecting the content on the basis of the recommended content information an operation mode is set to, in response to an operation in the operation means; and display control means for controlling display of the content information, the recommended content information, or the content provided from the content providing means on the basis of information about the mode. This brings about the effect that, in response to an operation, content information is selected and displayed in the user-driven mode, and recommended content information is selected and displayed in the apparatus-driven mode.

In the embodiment of the present invention, the mode holding means may include: flag holding means for holding a flag indicating one of the apparatus-driven mode and the user-driven mode; apparatus-driven mode shift determination means for determining whether or not the operation mode should shift to the apparatus-driven mode in response to an operation and for setting the apparatus-driven mode into the flag when it is determined that the operation mode should shift to the apparatus-driven mode; and user-driven mode shift determination means for determining whether or not the operation mode should shift to the user-driven mode in response to an operation and for setting the user-driven mode into the flag when it is determined that the operation mode should shift to the user-driven mode. This brings about the effect that information about a mode, in which the operation mode should shift to the user-driven mode or to the apparatus-driven mode, is supplied via the flag in response to an operation.

The operation means may be a controller including an apparatus-driven mode setting button for shifting to the apparatus-driven mode, and the apparatus-driven mode shift determination means may determine that the operation mode should shift to the apparatus-driven mode when the apparatus-driven mode setting button is pressed. This brings about the effect that, as a result of pressing the apparatus-driven mode setting button, the operation mode shifts to the apparatus-driven mode.

The operation means may be a controller including two or more operation buttons, and the user-driven mode shift determination means may determine whether or not the operation mode should shift to the user-driven mode on the basis of the type of the pressed operation button. This brings about the effect that, as a result of pressing a button other than a dedicated button for shifting to the apparatus-driven mode, the operation mode shifts to the apparatus-driven mode. This is a situation identical to that, in a screen saver, when operation means such as a keyboard or a remote controller is operated, the screen returns to the normal screen.

The operation means may be a controller including a selection button for selecting the content and a selection decision button for deciding the selection, and the user-driven mode shift determination means may determine whether or not the operation mode should shift to the user-driven mode when a button other than the selection button and the selection decision button is pressed. This brings about the effect that, as a result of pressing a button other than the selection button and the selection decision button for deciding the selection, the operation mode shifts to the apparatus-driven mode.

The operation means may be a controller including a power-supply button of the information processing apparatus, and the user-driven mode shift determination means may determine whether or not the operation mode should shift to the user-driven mode when the power-supply button is pressed. This brings about the effect that, as a result of pressing the power-supply button, the operation mode shifts to the apparatus-driven mode.

The operation means may be a controller including a selection button for selecting the content corresponding to the content information and selecting the content corresponding to the recommended content information, and a selection decision button for deciding the selection. This brings about the effect that an operation for, for example, playing back content, is performed using a button common to both the user-driven mode and the apparatus-driven mode.

According to another embodiment of the present invention, there is provided an information processing apparatus including: content storage means for storing content; content information storage means for storing content information for specifying the content; content information providing means for providing the content information; recommended content information providing means for selecting, as recommended content information, content information of the content that should be recommended from the content information storage means in accordance with predetermined conditions and for providing the recommended content information; operation signal receiving means for receiving an operation signal for the information processing apparatus; content providing means for obtaining and providing content corresponding to the content information or content corresponding to the recommended content information in response to the operation signal; mode holding means for, in response to the operation signal, holding information indicating which one of a user-driven mode for selecting the content on the basis of the content information and an apparatus-driven mode for selecting the content on the basis of the recommended content information an operation mode is set to; and display control means for controlling display of the content information, the recommended content information, or the content provided from the content providing means on the basis of information about the mode. This brings about the effect that, in response to an operation signal, content information is selected and displayed in the user-driven mode, and recommended content information is selected and displayed in the apparatus-driven mode.

According to another embodiment of the present invention, there is provided an information processing method for use with an information processing apparatus including operation signal receiving means for receiving an operation signal for the information processing apparatus; and mode holding means for, in response to the operation signal, holding information indicating which one of a user-driven mode for selecting content on the basis of content information for specifying content and an apparatus-driven mode for selecting recommended content information that is the content information that should be recommended an operation mode is set to, or there is provided a program for enabling a computer to perform processing, the information processing method or the program including the steps of: determining whether or not a time during which the operation signal is not received has continued for a predetermined time; setting the apparatus-driven mode to the mode holding means when the time during which the operation signal is not received has continued for the predetermined time; determining whether or not a specific signal is received as the operation signal after the setting is performed; and setting the user-driven mode to the mode holding means when the specific signal is received. This brings about the effect that, as a result of performing no operation, the operation mode shifts from the user-driven mode to the apparatus-driven mode, and as a result of pressing a predetermined button and supplying an operation signal, the operation mode shifts from the apparatus-driven mode to the user-driven mode.

According to another embodiment of the present invention, there is provided an information processing method for use with an information processing apparatus including operation signal receiving means for receiving an operation signal for the information processing apparatus; and mode holding means for, in response to the operation signal, holding information indicating which one of a user-driven mode for selecting content on the basis of the content information and an apparatus-driven mode for selecting recommended content information that is the content information that should be recommended an operation mode is set to, or there is provided a program for enabling a computer to perform processing, the information processing method or the program including the steps of: determining a number of receptions of a predetermined signal in the operation signal; setting the apparatus-driven mode to the mode holding means when the number of receptions exceeds a predetermined threshold value; determining whether or not a specific signal is received as the operation signal after the setting is performed; and setting the user-driven mode to the mode holding means when the specific signal is received. This brings about the effect that, on the basis of the number of occurrences of operation, the operation mode shifts from the user-driven mode to the apparatus-driven mode, and as a result of pressing a predetermined button and supplying an operation signal, the operation mode shifts from the apparatus-driven mode to the user-driven mode.

BRIEF DESCRIPTION OF THE DRAWINGS

FIG. 6 shows an example of a display screen in the case of a user-driven mode in the embodiment of the present invention;

FIG. 8 shows a state in which an operation mode shifts from a user-driven mode to an apparatus-driven mode when a no-operation state continues for a predetermined time;

FIG. 10 shows a state in which the operation mode shifts from the user-driven mode to the apparatus-driven mode when the number of references to a content information list reaches a predetermined number of occurrences;

FIG. 11 shows a state in which the operation mode shifts from the user-driven mode to the apparatus-driven mode by using a dedicated menu for shifting from the user-driven mode to the apparatus-driven mode;

FIG. 16 shows a viewing history in the embodiment of the present invention;

DETAILED DESCRIPTION

Embodiments of the present invention will now be described below in detail with reference to the drawings.

Figure 1:
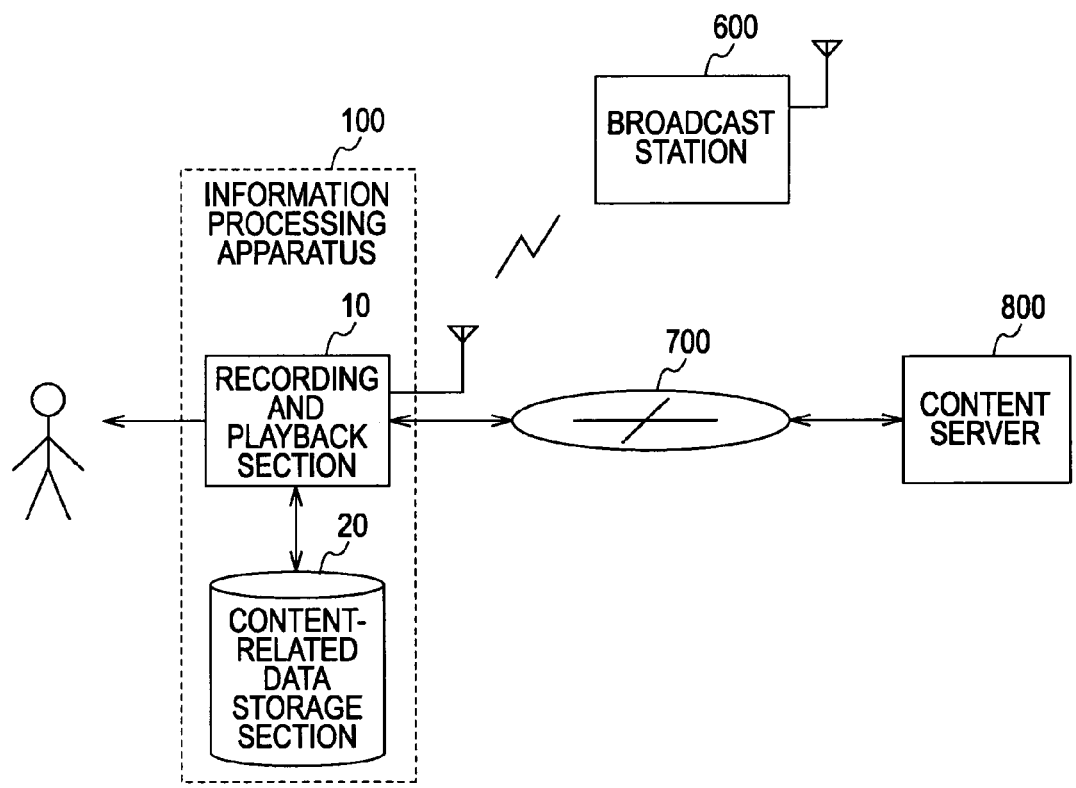
FIG. 1 shows an example of the configuration of an information processing system according to an embodiment of the present invention.

FIG. 1 shows an example of the configuration of an information processing system according to an embodiment of the present invention. The information processing system includes an information processing apparatus 100, a broadcast station 600, a network 700, and a content server 800. The number of each of the broadcast station and the content server is not limited to one and may be plural. Content in the embodiment of the present invention refers to text, still images, moving images, music, and audio that can be viewed or listened to in the information processing apparatus 100.

The information processing apparatus 100 receives content transmitted from the broadcast station 600 and allows a recording and playback section 10 to store the content in a content-related data storage section 20. The content stored in the content-related data storage section 20 is played back by the recording and playback section 10 in response to a request from a user, and the user views or listened to it.

A list for the content stored in the content-related data storage section 20 is presented to the user via a display section (not shown). The user selects content desired to be viewed from the presented list. There are two types of lists to be presented. One of them is a list of content presented on the basis of a date and time specified by the user. This content list is such that information, such as titles of content stored in the content-related data storage section 20 on the date and time specified by the user, is arranged in order of date and time. The other is a list of content selected by the information processing apparatus 100 from the content-related data storage section 20 for the purpose of recommending it to the user on the basis of the viewing history of the content by the user and feature data for the content. It is possible for the user to select content desired to be viewed or listened to on the basis of these two types of lists for content.

These two types of lists of content are displayed in a switched manner under predetermined conditions. In the embodiment of the present invention, usually, a list of content presented on the basis of, for example, the date and time specified by the user, is displayed. However, under predetermined conditions, a list of content selected by the information processing apparatus 100 from the content-related data storage section 20 is displayed.

The broadcast station 600 transmits content. The content server 800 is a server for storing content, and content stored in the content server 800 can be obtained via the network 700. In the embodiment of the present invention, the content stored in the information processing apparatus 100 may be not only content transmitted from the broadcast station 600, but also may be content stored in the content server 800. For the network 700, for example, the Internet is assumed, but another network using a dedicated line may also be used.

Figure 2:
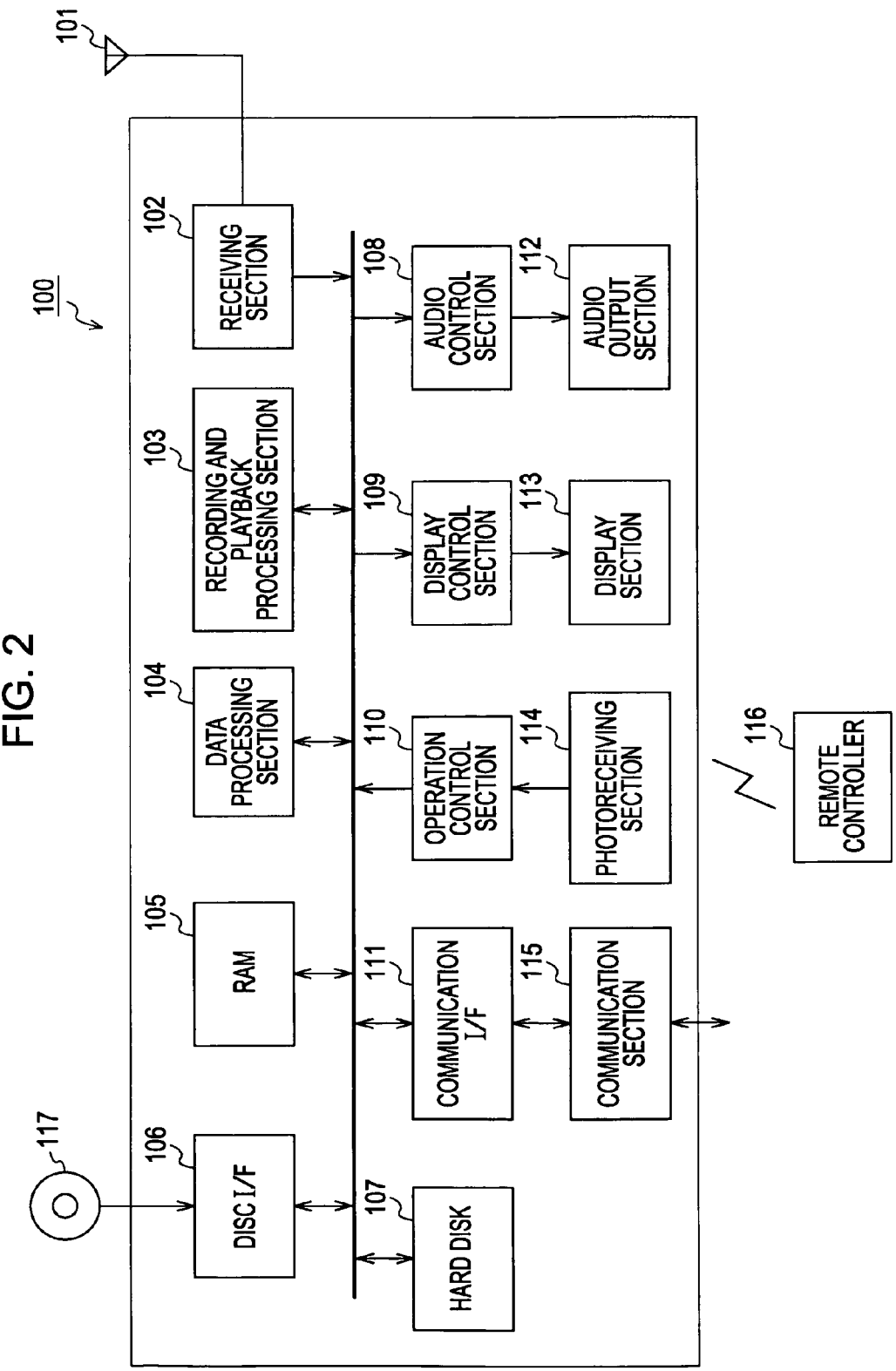
FIG. 2 shows an example of the configuration of an information processing system 100 according to an embodiment of the present invention.

FIG. 2 shows an example of the configuration of the information processing apparatus 100 according to an embodiment of the present invention. The information processing apparatus 100 includes an antenna 101, a receiving section 102, a recording and playback processing section 103, a data processing section 104, a RAM (Random Access Memory) 105, a disc interface 106, a hard disk 107, an audio control section 108, a display control section 109, an operation control section 110, a communication interface 111, an audio output section 112, a display section 113, a photoreceiving section 114, a communication section 115, and a remote controller 116. The antenna 101 serves to receive radio waves transmitted through the air. The receiving section 102 performs processing, such as a demodulation process and D/A conversion, on the received data supplied from the antenna 101.

The recording and playback processing section 103 performs encoding of data supplied from the receiving section 102 in accordance with, for example, the MPEG-2 (Moving Picture Expert GrouP-2) standard. The encoded data is supplied to the hard disk 107 or the disc interface 106. The recording and playback processing section 103 performs a decoding process on the data supplied from the hard disk 107 or the disc interface 106. This decoded data is supplied to the audio control section 108 and the display control section 109.

The data processing section 104 controls the overall processing of the information processing apparatus 100 and uses the RAM 105 as a work area. The disc interface 106 writes the data on which predetermined processing has been performed by the recording and playback processing section 103 into a disc 117. The disc interface 106 reads data from the disc 117 and supplies it to the recording and playback processing section 103. For the disc 117, an optical disc, such as a CD or a DVD, is assumed. Furthermore, a storage medium other than a disc may also be used. The hard disc 107 stores data on which predetermined processing is performed by the recording and playback processing section 103.

The audio control section 108 supplies the supplied music data to the audio output section 112. Music data is output from the audio output section 112. The display control section 109 supplies the supplied image data to the display section 113 formed of, for example, an LCD (Liquid Crystal Display). On the display section 113, the image data is output.

The remote controller 116 is used for the user to perform a desired operation. An operation signal transmitted from the remote controller 116 is received by the photoreceiving section 114, and the photoreceiving section 114 supplies the operation signal to the operation control section 110. The operation control section 110 transmits the supplied operation signal to the data processing section 104.

The communication interface 111 generates frames from the data supplied from the data processing section 104 or the like and supplies the generated frames to the communication section 115. Furthermore, the communication interface 111 performs predetermined processing on the frames supplied from the communication section 115 and supplies them to the data processing section 104. The communication section 115 performs a process for converting the data supplied in the form of electrical signals over the network into data that can be handled by the data processing section 104. Furthermore, the communication section 115 performs a process for converting data sent from the data processing section 104 into electrical signals and for sending them to the network.

Figure 3:
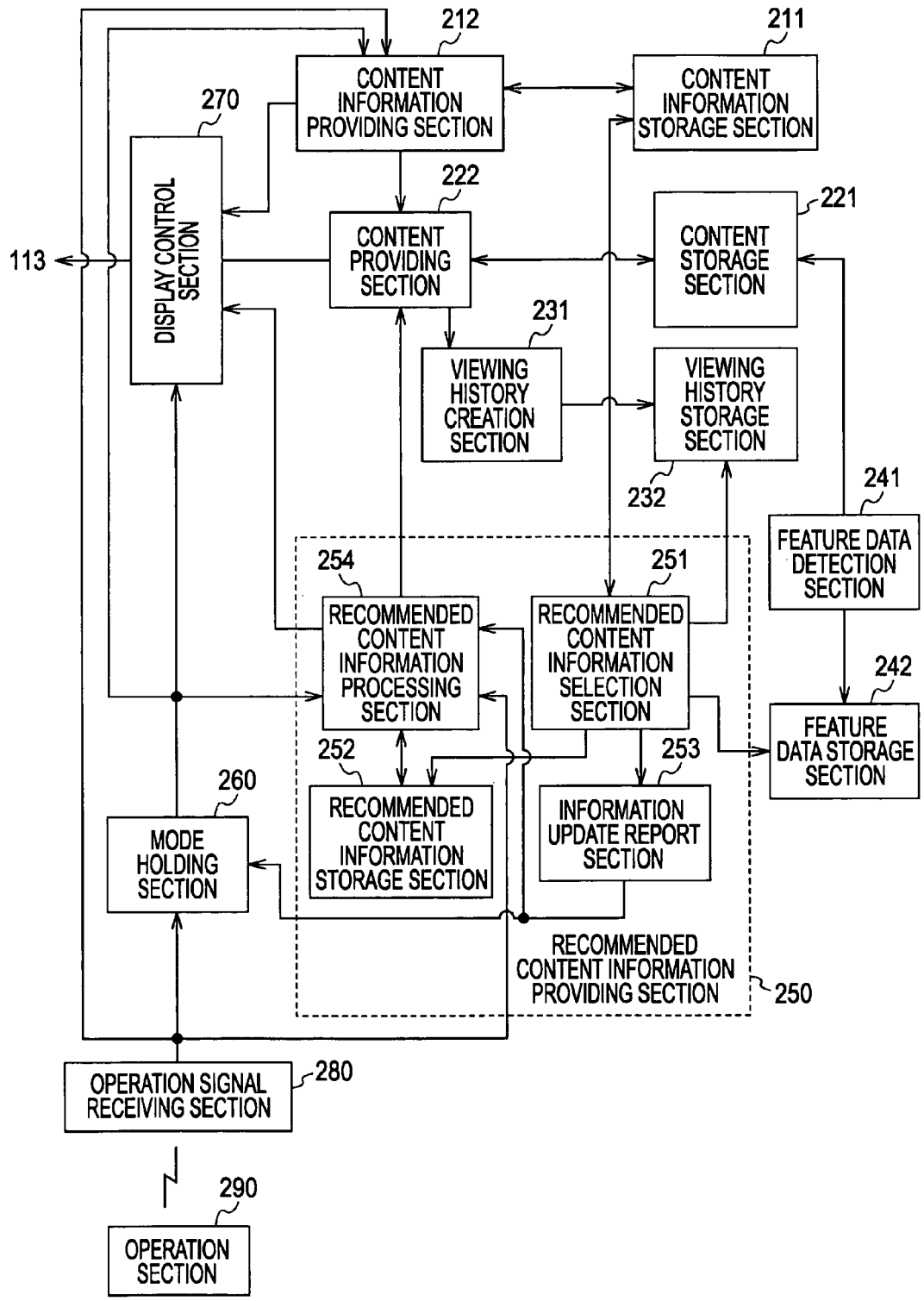
FIG. 3 shows an example of the structure of functions for providing content and a list for the content in the embodiment of the present invention.

FIG. 3 shows an example of the structure of functions for providing content and a list for the content in the embodiment of the present invention. These functions include a content information storage section 211, a content information providing section 212, a content storage section 221, a content providing section 222, a viewing history creation section 231, a viewing history storage section 232, a feature data detection section 241, a feature data storage section 242, a recommended content information providing section 250, a mode holding section 260, a display control section 270, an operation signal receiving section 280, and an operation section 290.

The content storage section 221 stores content obtained from the broadcast station 600 or the content server 800. Furthermore, the content stored in the content storage section 221 may be content read from an optical disc. The content information storage section 211 stores information for specifying content (hereinafter referred to as "content information") stored in the content storage section 221. This information for specifying content includes, for example, the title of content, the date and time at which the content was recorded in the content storage section 210, and a unique identifier (ID) attached to the content.

The content information providing section 212 creates a list for content based on the date and time at which a request was made from the user via the operation section 290 (hereinafter referred to as a "content information list"), and supplies it to the display control section 270. The creation of the content information list is performed on the basis of the content information stored in the content information storage section 211. For example, when a specific date and time is specified by the user, the content information of the content recorded in the content storage section 221 at that date and time is obtained, and a list in order of the time at which recording was performed is created. Furthermore, when the user selects specific content from the created list via the operation section 290, the content information providing section 212 supplies the information corresponding to the selected content to the content providing section 222. For example, the above-described unique identifier attached to the content corresponds to the information corresponding to the selected content.

The content providing section 222 obtains content from the content storage section 221 on the basis of the information (for example, a unique identifier attached to the content) corresponding to the specific content supplied from the content information providing section 212. Furthermore, the content providing section 222 obtains content from the content storage section 221 on the basis of information (for example, a unique identifier attached to the content) corresponding to the specific content supplied from the recommended content information processing section 254. The obtained content is supplied to the display control section 270. Furthermore, the content providing section 222 supplies, to the viewing history creation section 231, information corresponding to the specific content supplied from the content information providing section 212 and the recommended content information processing section 254.

The viewing history creation section 231 creates a history of content viewed by the user on the basis of the information corresponding to the specific content supplied from the content providing section 222. The viewing history created by the viewing history creation section 231 is stored in the viewing history storage section 232.

The feature data detection section 241 detects feature data of audio data and image data from the data, such as the audio data and the image data in the content. Here, for the feature data, for example, audio feature data corresponding to features of audio data, or subtitles feature data corresponding to the appearance of subtitles information is assumed, but the feature data is not limited to them. In addition, the feature data may be, for example, camera feature data corresponding to features of camera operation, such as panning and zooming, color feature data corresponding to features of color information on the screen, and scene ID data for indicating whether a similar scene has appeared using a predetermined ID. The feature data detected by the feature data detection section 241 is stored in the feature data storage section 242.

The recommended content information providing section 250 includes a recommended content information selection section 251, a recommended content information storage section 252, an information update report section 253, and a recommended content information processing section 254. The recommended content information selection section 251 selects content information in accordance with predetermined conditions from the content information stored in the content information storage section 211. The selected content information is stored as content information to be recommended to the user (hereinafter referred to as "recommended content information") in the recommended content information storage section 252.

Here, a description is given of conditions when content is to be selected. When predetermined content is to be selected from the content information stored in the content information storage section 211, for example, content is selected from various viewpoints on the basis of the viewing history stored in the viewing history storage section 232. For example, it is assumed that content that is not yet viewed by the user is selected in old order of the recording date and time, or content of a genre (for example, news, drama, and movie) with which the number of viewings by the user is high, which is not yet viewed by the user, is selected.

When content is to be selected from the content information stored in the content information storage section 211, for example, the content may be selected on the basis of the feature data of the content stored in the feature data storage section 242. In this case, the user sets in advance parameters on the selection of the feature data. Then, the content information corresponding to the feature data matching the parameters is selected by the recommended content information selection section 251.

The recommended content information may be updated under predetermined conditions. For example, it is assumed that the recommended content information is selected by the recommended content information selection section 251 at predetermined intervals. Furthermore, each time new content information is added to the content information storage section 211, the recommended content information may be selected by the recommended content information selection section 251.

When the recommended content information is updated in the recommended content information selection section 251, the information update report section 253 reports the fact to the recommended content information processing section 254 and the mode holding section 260.

The recommended content information processing section 254 creates a list for recommended content information (hereinafter referred to as a "recommended content information list") in a predetermined format on the basis of the recommended content information stored in the recommended content information storage section 252 and supplies the list to the display control section 270. For the format of the recommended content information list, for example, recommended content information that is represented by a title of the content and by a thumbnail about the content is assumed. However, the format of the recommended content information list is not limited to this example and may be other formats.

When the recommended content information processing section 254 receives a report from the information update report section 253, the recommended content information processing section 254 creates the list by adding the fact that the information is updated to the format. When content is selected from the recommended content information list created by the user via the operation section 290, the recommended content information processing section 254 supplies information corresponding to the selected content to the content providing section 222. In the same manner as in the content information providing section 212, for example, a unique identifier attached to the content corresponds to the information corresponding to the selected content.

The mode holding section 260 holds information indicating which one of the user-driven mode and the apparatus-driven mode the operation mode of the information processing apparatus 100 is. On the basis of this information, the operation mode shifts to one of the user-driven mode and the apparatus-driven mode. Here, the user-driven mode refers to a state in which, in response to a request from the user, content requested by the user can be selected from the content information list provided from the content information providing section 212. On the other hand, the apparatus-driven mode refers to a state in which content requested by the user can be selected from the recommended content information list created by the recommended content information processing section 254. Information as to which one of the user-driven mode and the apparatus-driven mode the operation mode is set to is set in accordance with, for example, a signal supplied from the operation signal receiving section 280.

After the operation mode shifts to the user-driven mode, the user can select content shown in the content information list via the operation section 290. On the other hand, after the operation mode shifts to the apparatus-driven mode, the user can select content shown in the recommended content information list via the operation section 290.

The display control section 270 supplies, to the display section 113, the content information list, the content, and the recommended content information list, which are supplied to the content information providing section 212, the content providing section 222, and the recommended content information processing section 254, respectively. After the operation mode shifts to the user-driven mode, the display control section 270 displays with priority the content information list supplied from the content information providing section 212. On the other hand, after the operation mode shifts to the apparatus-driven mode, the display control section 270 displays with priority the recommended content information list supplied from the recommended content information processing section 254. When the recommended content information is updated, it is assumed that the information such that the recommended content information is updated is displayed with highest priority. The operation signal receiving section 280 receives a signal transmitted from the operation section 290 and supplies it to the mode holding section 260, the recommended content information processing section 254, and the content information providing section 212.

The content information storage section 211, the content storage section 221, the viewing history storage section 232, and the feature data storage section 242 can be implemented in, for example, the hard disk 107. Furthermore, the recommended content information storage section 252 can be implemented in, for example, the RAM 105 or the hard disk 107. Furthermore, the content information providing section 212, the viewing history creation section 231, the feature data detection section 241, the recommended content information selection section 251, the information update report section 253, the recommended content information processing section 254, and the mode holding section 260 can be implemented in, for example; the data processing section 104. The content providing section 222 can be mainly implemented in, for example, the recording and playback processing section 103. The display control section 270 corresponds to the display control section 109. The operation signal receiving section 280 can be implemented in, for example, the operation control section 110 and the photoreceiving section 114. The operation section 290 can be implemented in, for example, the remote controller 116.

Figure 4:
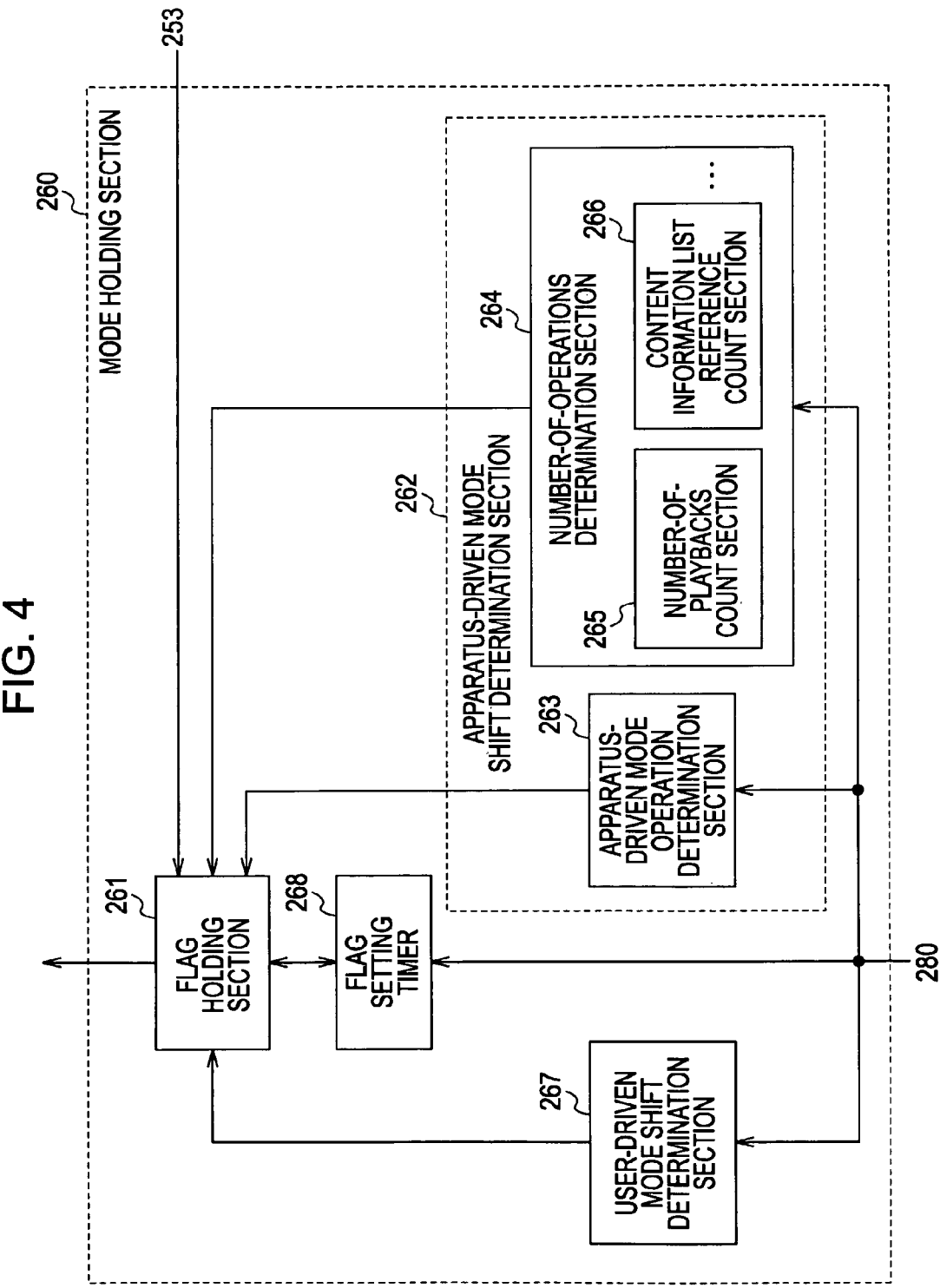
FIG. 4 shows an example of the functional structure of a mode holding section 260.

FIG. 4 shows an example of the structure of functions of the mode holding section 260. The mode holding section 260 includes a flag holding section 261, an apparatus-driven mode shift determination section 262, a user-driven mode shift determination section 267, and a flag setting timer 268.

The flag holding section 261 holds a flag indicating which one of the apparatus-driven mode and the user-driven mode the operation mode is set to. Depending on which one of the user-driven mode and the apparatus-driven mode this flag is set, it is determined whether the operation mode should shift to the user-driven mode or to the apparatus-driven mode. In response to this flag, the content information providing section 212, the recommended content information processing section 254, and the display control section 270 operate in the user-driven mode or in the apparatus-driven mode. That is, in the user-driven mode, the content information providing section 212 operates, and in the apparatus-driven mode, the recommended content information processing section 254 operates. Furthermore, in the user-driven mode, the display control section 270 displays with priority the content information list, and in the apparatus-driven mode, the display control section 270 displays with priority the recommended content information list.

The apparatus-driven mode shift determination section 262 determines whether or not the operation mode should shift to the apparatus-driven mode in response to the operation signal supplied from the operation signal receiving section 280. When it is determined by the apparatus-driven mode shift determination section 262 that the operation mode should shift to the apparatus-driven mode, the apparatus-driven mode shift determination section 262 sets the flag held in the flag holding section 261 to the apparatus-driven mode.

The determination as to whether or not the flag held in the flag holding section 261 should be set to the apparatus-driven mode is specifically performed by the apparatus-driven mode operation determination section 263 or the number-of-operations determination section 264. The apparatus-driven mode operation determination section 263 determines whether or not the operation mode should shift to the apparatus-driven mode by making a determination as to the type of the operation signal supplied from the operation signal receiving section 280. For example, when the operation section 290 includes a plurality of buttons and when there is a button for setting to the apparatus-driven mode, it is determined that the operation mode should shift to the apparatus-driven mode when an operation signal corresponding to that button is supplied.

The number-of-operations determination section 264 determines whether or not the operation mode should shift to the apparatus-driven mode in response to the number of occurrences of the operation signal supplied from the operation signal receiving section 280. That is, when the number of receptions of a specific operation signal reaches a predetermined threshold value, it is determined that the operation mode should shift to the apparatus-driven mode. The reason why the number of receptions of the operation signal is used as a reference is that, when the operation signal is frequently supplied, the user is often at a loss about which content should be viewed or listened to. In this case, if the information processing apparatus 100 presents content to be recommended, this is considered to become convenient for the user.

For the number of occurrences of operation, specifically, the number of playbacks of content or the number of references to the content information list in a predetermined time is assumed. Here, the number of references to the content information list is described below. The content information list is created on the basis of the date and time specified by the user. While a content information list corresponding to a certain date and time is being displayed, when the user specifies another date and time so as to display a content information list corresponding thereto, the number of references to the content information list is set as one time.

In FIG. 4, the number of playbacks count section 265 and the content information list reference count section 266 correspond to the above-described number of occurrences of operation. The number-of-playbacks count section 265 counts the number of playbacks of content for a predetermined time and determines that the operation mode should shift to the apparatus-driven mode when the number of playbacks reaches a predetermined threshold value. The counting of the number of playbacks is performed when an operation signal corresponding to the playback of content is supplied from the operation signal receiving section 280. In the case of an operation signal other than the operation signal corresponding to the playback of content, no counting is performed. The content information list reference count section 266 counts the number of references to the content information list for a predetermined time and determines that the operation mode should shift to the apparatus-driven mode when the number of references reaches a predetermined threshold value. The counting of the number of references to the content information list is performed when an operation signal is supplied from the operation signal receiving section 280. In the case of an operation signal other than the operation signal corresponding to the reference to the content information list, no counting is performed.

The user-driven mode shift determination section 267 determines whether or not the operation mode should shift to the user-driven mode on the basis of the operation signal supplied from the operation signal receiving section 280. When it is determined by the user-driven mode shift determination section 267 that the operation mode should shift to the user-driven mode, the user-driven mode shift determination section 267 sets the flag held in the flag holding section 261 to the user-driven mode.

For example, when the operation section 290 is a remote controller including a plurality of buttons, whether or not the flag held in the flag holding section 261 should be set to the user-driven mode is determined by the type of operation signal corresponding to the pressed button. In this case, which button should be pressed to cause the operation mode to shift to the user-driven mode is determined in advance. For example, a dedicated button for shifting to the user-driven mode may be provided. In addition, when a button other than a selection and decision button for selecting and deciding a recommended content information list or a power-supply button is pressed, the operation mode may be set to the user-driven mode.

The flag setting timer 268 sets the flag held in the flag holding section 261 to the apparatus-driven mode when a state in which an operation signal is not supplied from the operation signal receiving section 280 continues for a predetermined time. Furthermore, the flag setting timer 268 may set the flag to the user-driven mode after a predetermined time has passed since the flag is set to the apparatus-driven mode. The setting of the flag for shifting from the apparatus-driven mode to the user-driven mode and the setting of the flag for shifting from the user-driven mode to the apparatus-driven mode may be performed periodically by the flag setting timer 268.

Figure 5:
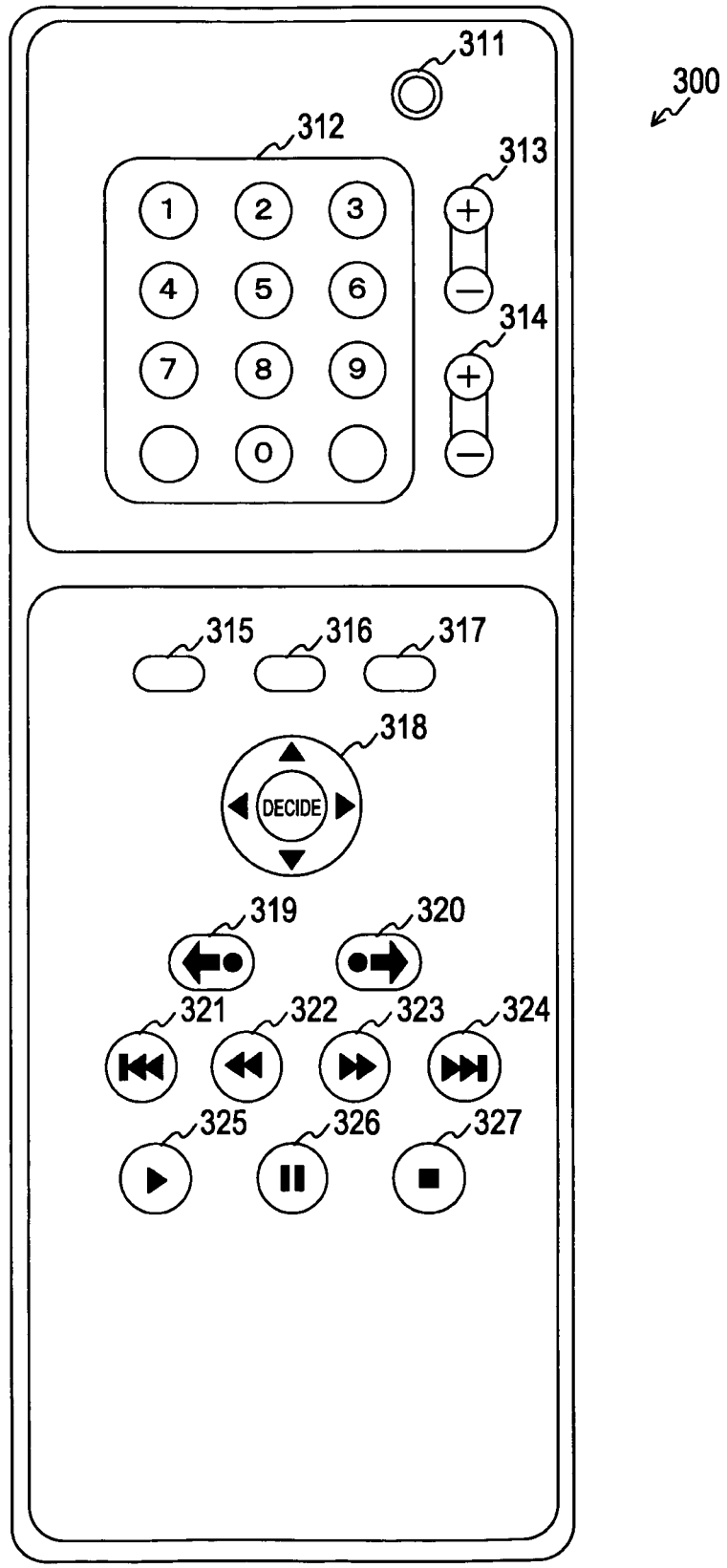
FIG. 5 shows the configuration of a remote controller in the embodiment of the present invention.

FIG. 5 shows the configuration of a remote controller according to an embodiment of the present invention. The remote controller 300 corresponds to the remote controller 116 in FIG. 2 and the operation section 290 in FIG. 3. As shown in FIG. 5, the remote controller 300 includes a power-supply button 311 that is operated when the power supply is to be switched on/ff, a ten-key pad 312 that is operated when a channel is to be selected, a channel button 313 that is operated when channels are to be sequentially selected, and a sound volume button 314 that is operated when sound volume adjustment is to be performed.

The remote controller 300 includes a system menu button 315 that is operated when the display of a system menu is to be instructed, a title list button 316 that is operated when the display of a title list is to be instructed, a tool button 317 when the display of a tool is to be instructed, a selection and decision button 318 that is operated when the movement of a cursor to the left, right, up, or down, or a decision is to be instructed, a backward skip button 319 that is operated when a video currently being played back is to be skipped backwards, and a forward skip button 320 that is operated when a video currently being played back is to be skipped forwards.

Furthermore, the remote controller 300 includes a backward button 321 that is operated when the user wants to return to the previous title, chapter, or track; a forward button 324 that is operated when the user wants to advance to the next title, chapter, or track; a fast-rewind button 322 that is operated when rewinding is to be performed; a fast forward button 323 that is operated when fast forwarding is to be performed; a play button 325 that is operated when playback is to be instructed; a pause button 326 that is operated when the pause of playback is to be instructed; and a stop button 327 that is operated when the stop of playback is to be instructed.

FIG. 6 shows an example of a display screen in the case of a user-driven mode according to an embodiment of the present invention. Part A of FIG. 6 shows an example of the display format of a content information list 410 on a display screen 400 in the user-driven mode. In part A of FIG. 6, as the content information list 410, a recording date 411 and a recording time 412 when content was recorded in the information processing apparatus 100 in the embodiment of the present invention, and the content information specified by a title 413 of the content are displayed in such a manner as to be arranged in the order of the recording time 412.

A setting button 422 is a button for setting the recording date and time of content information to be displayed into the content information list 410. More specifically, when the setting button 422 is selected and decided using the remote controller 300, a screen for setting the recording date and the recording time of the content information (not shown) is displayed. On that screen, the recording date and the recording time of content, which is desired to be displayed, for example, as content information, are set. As a result, when a decision button 421 is selected and decided using the remote controller 300, the content information list 410 matching the set recording date and recording time is displayed. After the screen is set to a screen for setting the recording date and time of the content information (not shown), a return button 423 is selected using the remote controller 300 when returning to the original screen without setting at all.

The recommended content information display button 424 is a button for shifting to the apparatus-driven mode. That is, when the recommended content information display button 424 is selected and decided using the remote controller 300, in the apparatus-driven mode, a recommended content information list is displayed on the display screen 400. Furthermore, when the recommended content information is updated, a display 425 for the fact is displayed in such a manner as "the recommended content information is updated". This display 425 may be erased after it is displayed for a predetermined time or may be erased after the updated recommended content information list is displayed once.

part B of FIG. 6 shows an example of the display screen 400 on which content is being played back. For example, when "May 9 5:30 PM news A" is selected from the content information list 410 shown in part A of FIG. 6 by using a selection and decision button 318 of the remote controller 300, the color of the part corresponding thereto is changed. After the selection, when the decision button in the center of the selection and decision button 318 of the remote controller 300 is pressed, content corresponding to "May 9 5:30 PM news A" is played back, and the display screen 400 is displayed as shown in part B of FIG. 6.

Figure 7:
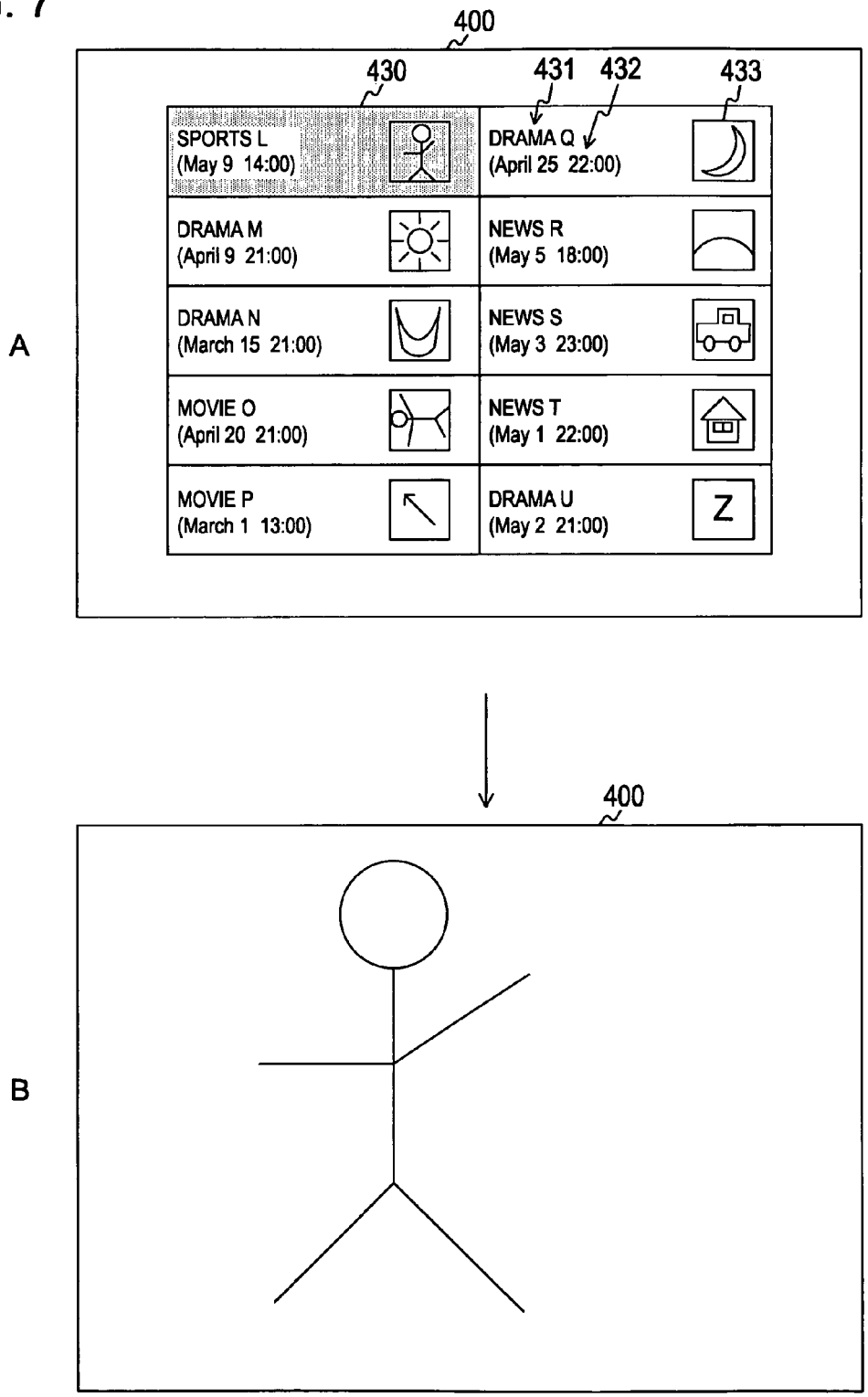
FIG. 7 shows an example of a display screen in the case of an apparatus-driven mode in the embodiment of the present invention.

FIG. 7 shows an example of a display screen in the case of the apparatus-driven mode in the embodiment of the present invention. Part A of FIG. 7 shows an example of a display form of a recommended content information list 430 on the display screen 400 during the apparatus-driven mode. In part A of FIG. 7, as the recommended content information list 430, a plurality of pieces of recommended content information specified by a title 431 of content, a recording date and time 432 of the content, and a thumbnail 433 generated on the basis of an arbitrary image of the content are displayed.

Part B of FIG. 7 shows an example of a display screen on which content is being played back. For example, when "sports L May 9 14:00 thumbnail image (thumbnail image of a person)" is selected from the recommended content information list 430 shown in part A of FIG. 7 by using the selection and decision button 318 of the remote controller 300, the part corresponding thereto is changed. After the selection, when the decision button in the center of the selection and decision button 318 of the remote controller 300 is pressed, content corresponding to "sports L May 9 14:00 thumbnail image" is played back, and the display screen 400 is displayed as shown in part B of FIG. 7.

FIG. 8 shows a state in which, when a no-operation state continues for a predetermined time, the operation mode shifts from the user-driven mode to the apparatus-driven mode. When the display screen 400 is in the user-driven mode, the content information list 410 is displayed. In the user-driven mode, when operation is not performed at all from the remote controller 300 or the like for a predetermined time, the operation mode shifts to the apparatus-driven mode. When the operation mode shifts to the apparatus-driven mode, the recommended content information list 430 is displayed on the display screen 400.

When the operation mode shifts from the user-driven mode to the apparatus-driven mode, the recommended content information list 430 in the apparatus-driven mode may be displayed after a screen (not shown) on which the fact that the screen is to be switched is displayed once instead of the screen being immediately switched from the screen on which the content information list 410 is displayed to the screen on which the recommended content information list 430 is displayed after a predetermined time has passed.

Figure 9:
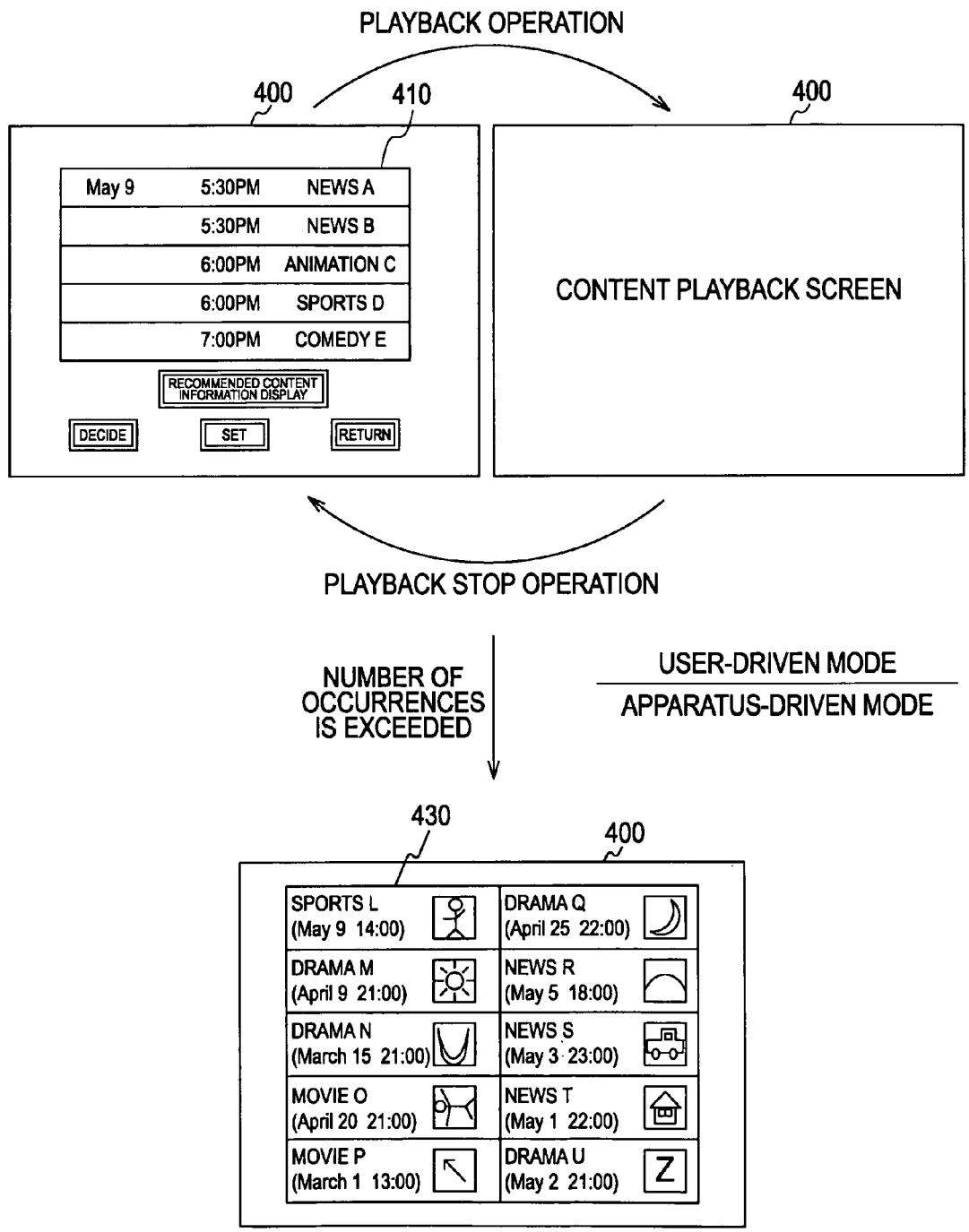
FIG. 9 shows a state in which the operation mode shifts from the user-driven mode to the apparatus-driven mode when the number of content playback operations and the number of playback stop operations reach a predetermined number of occurrences.

FIG. 9 shows a state in which the operation mode shifts from the user-driven mode to the apparatus-driven mode when the number of content playback operations or the number of playback stop operations reaches a predetermined number of occurrences. In the case of the user-driven mode, the content information list 410 is displayed on the display screen 400. When the user selects and decides content desired to be viewed from the content information list 410 by using the remote controller 300, content corresponding to the content information is played back on the display screen 400. When the played content is to be stopped, for example, a stop button 327 of the remote controller is pressed. Thereafter, the content information desired to be further viewed is selected and played back, and is stopped.

When such playback operation and playback stop operation are repeated, when the playback operation and playback stop operation are repeated for a predetermined number of times within a predetermined time, the operation mode shifts from the user-driven mode to the apparatus-driven mode. When the operation mode shifts to the apparatus-driven mode, the recommended content information list 430 is displayed on the display screen 400. Also, in the case of FIG. 9, when the operation mode shifts from the user-driven mode to the apparatus-driven mode, after a screen on which the fact that the screen is to be switched (not shown) is displayed is displayed once, the recommended content information list 430 in the apparatus-driven mode may be displayed.

FIG. 10 shows a state in which the operation mode shifts from the user-driven mode to the apparatus-driven mode when the number of references to the content information list reaches a predetermined number of occurrences. In the case of the user-driven mode, the content information list 410 is displayed on the display screen 400. When the user wants to refer to the content information list for the content recorded on another date and time, the user sets the recording date and time of the content information list 410 desired to be displayed as described with reference to FIG. 6. As a result, the content information list 410 corresponding to the set recording date and time is displayed.

When the same operation is repeated and the number of references to the content information list reaches a predetermined number of times within a predetermined time, the operation mode shifts from the user-driven mode to the apparatus-driven mode. When the operation mode shifts to the apparatus-driven mode, the recommended content information list 430 is displayed on the display screen 400. Also, in the case of FIG. 9, when the operation mode shifts from the user-driven mode to the apparatus-driven mode, the recommended content information list 430 in the apparatus-driven mode may be displayed after a screen on which the fact (not shown) that the screen is to be switched is displayed once is displayed.

FIG. 11 shows a state in which the operation mode shifts from the user-driven mode to the apparatus-driven mode by using a dedicated menu for shifting from the user-driven mode to the apparatus-driven mode. In the case of the user-driven mode, at least the content information list 410 and the recommended content information display button 424 are displayed on the display screen 400. When the recommended content information display button 424 is selected and decided using the selection and decision button 318 of the remote controller 300, the operation mode shifts to the apparatus-driven mode. When the operation mode shifts to the apparatus-driven mode, the recommended content information list 430 is displayed on the display screen 400.

Figure 12:
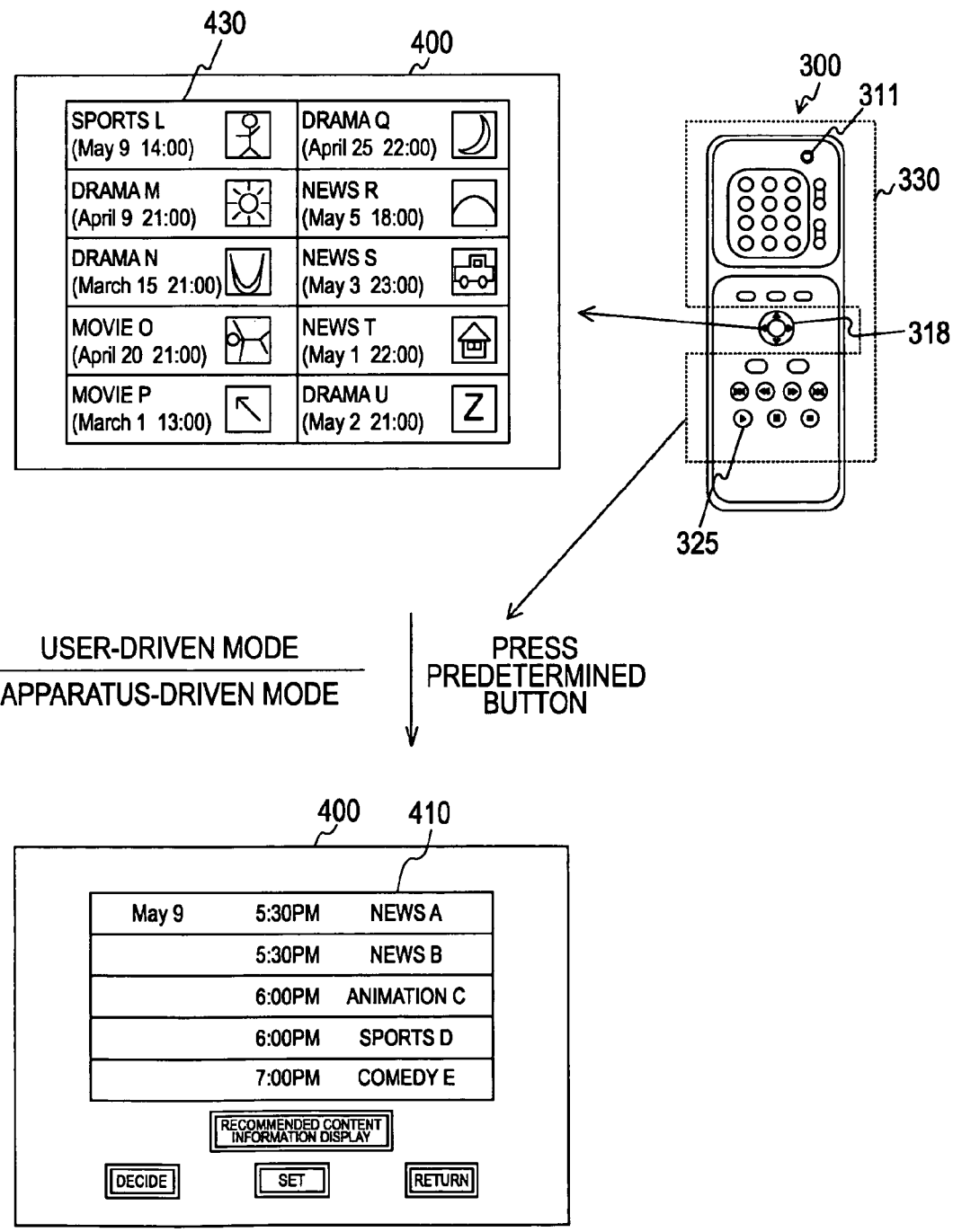
FIG. 12 shows a state in which the operation mode shifts from an apparatus-driven mode to a user-driven mode as a result of pressing a predetermined button in a remote controller 300.

FIG. 12 shows a state in which the operation mode shifts from the apparatus-driven mode to the user-driven mode as a result of pressing a predetermined button in the remote controller 300. In the case of the apparatus-driven mode, the recommended content information list 430 is displayed on the display screen 400. When desired content information is selected from the recommended content information list 430 and content corresponding thereto is to be played back, for example, the selection and decision button 318 in the remote controller 300 is used. When a set of buttons 330 other than the selection and decision button is pressed, the operation mode shifts from the apparatus-driven mode to the user-driven mode. When the operation mode shifts to the user-driven mode, the content information list 410 is displayed on the display screen 400.

For the apparatus-driven mode in FIG. 12, an image to be displayed as a screen saver, which is formed as a recommended content information list, is assumed. In this screen saver, when the user touches operation means such as a keyboard or a mouse, the screen returns to the original screen. In the embodiment of the present invention, similarly to this, in principle, when any one of the buttons of the remote controller 300, which is operation means, is pressed, the operation mode shifts from the apparatus-driven mode to the user-driven mode. However, even if the selection and decision button 318 used to select and play back content from the recommended content information list 430 is pressed, the operation mode does not shift from the apparatus-driven mode to the user-driven mode.

As a result of the above, since the operation for selecting and playing back content can be performed using the same button in both the states of the user-driven mode and the apparatus-driven mode, this is convenient for the operation by the user. That is, when the apparatus-driven mode is assumed as a state of a screen saver, when any one of the buttons in the remote controller 300 is pressed, the operation mode shifts from the apparatus-driven mode to the user-driven mode. However, it is troublesome for the user to memorize which one of the buttons should be pressed to shift from the apparatus-driven mode to the user-driven mode. In this case, if the function of the remote controller 300 in the user-driven mode, for example, the selection function of the selection and decision button 318 shown above, can be directly used for selection in the apparatus-driven mode, it becomes possible for the user to perform an intuitive operation. Therefore, the user can perform operation with ease without causing an unnatural sensation. Similarly to the selection and decision button 318, the playback button 325 in the remote controller 300 may also be configured in such a manner that, even if it is pressed, the operation mode does not shift from the apparatus-driven mode to the user-driven mode from the viewpoint of convenience for the operation by the user.

regarding the button for shifting the operation mode from the apparatus-driven mode to the user-driven mode, only the power-supply button 311 in the set of buttons 300 may be used as a button for shifting the operation mode from the apparatus-driven mode to the user-driven mode, and another button may also be used.

Figure 13:
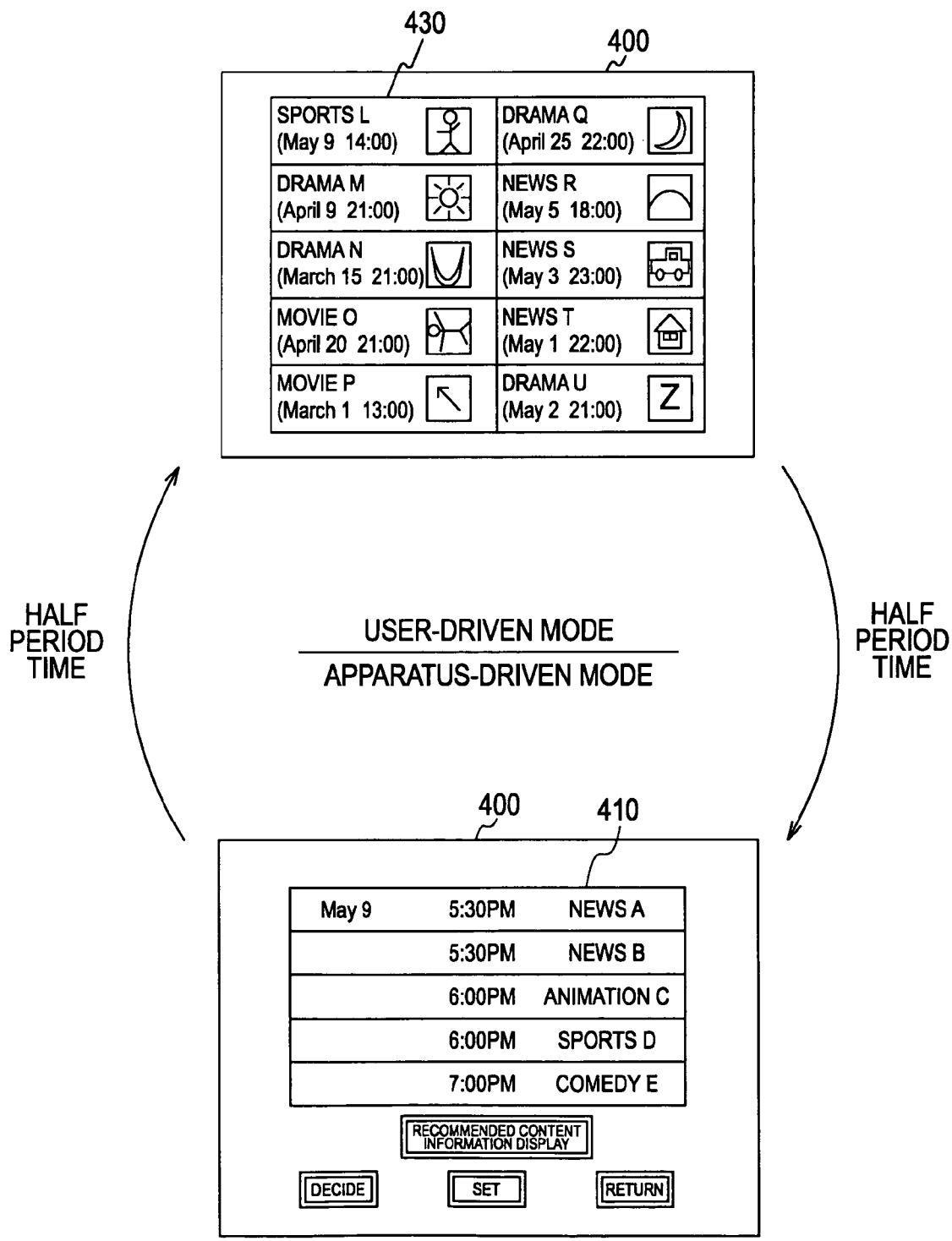
FIG. 13 shows a state in which, after the operation mode shifts from the user-driven mode to the apparatus-driven mode, the operation mode periodically shifts to the apparatus-driven mode and to the user-driven mode.

FIG. 13 shows a state in which, after the operation mode shifts from the user-driven mode to the apparatus-driven mode, the operation mode periodically shifts to the apparatus-driven mode or to the user-driven mode. In the case of the apparatus-driven mode, the recommended content information list 430 is displayed on the display screen 400, the operation mode shifts to the user-driven mode after a predetermined time, and the content information list 410 is displayed on the display screen 400. For example, it is assumed that the user-driven mode and the apparatus-driven mode are alternately switched at intervals of five minutes.

Figure 14:
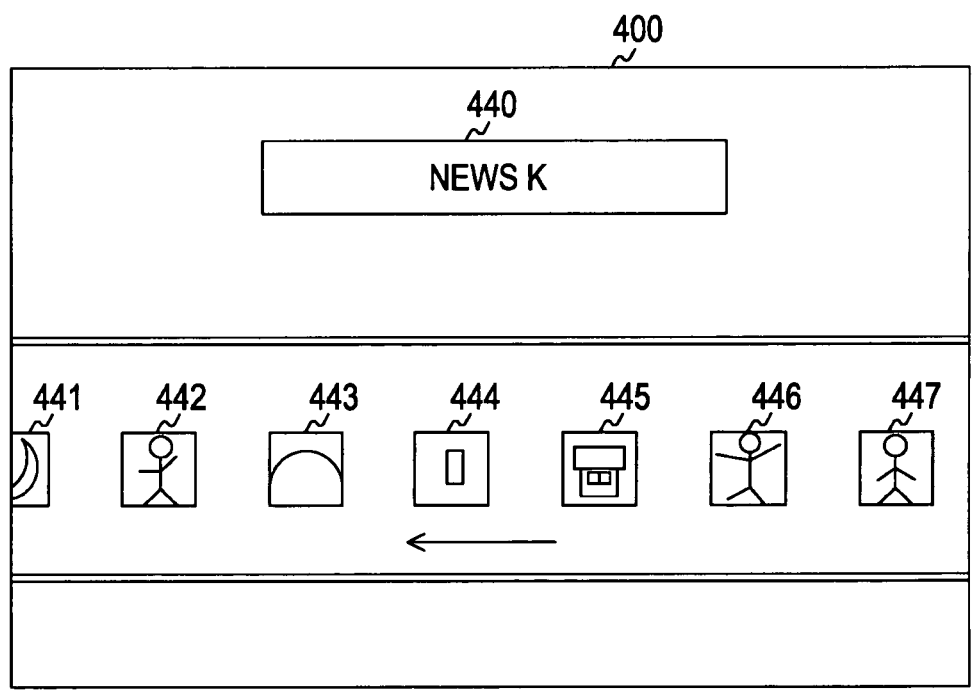
FIG. 14 shows another embodiment of recommended content information on the display screen 400.

FIG. 14 shows another embodiment of the recommended content information on the display screen 400 in the embodiment in FIG. 14, for the recommended content information, a title 440 of content and thumbnails 441 to 447 are displayed.

In FIG. 14, seven thumbnails are displayed. However, the thumbnails are not limited to this example, and any number of thumbnails may be used.

The thumbnails 441 to 447 are moved in the direction of the arrow shown in FIG. 14. These thumbnails are created by extracting feature scenes in the content. For example, it is assumed that scenes in the content for which a user gets excited are extracted are used as feature scenes. For the scenes, a scene in the content for which a user gives a cheer, and a scene immediately before entering a CM when the content is a broadcast program, are assumed. Data of content may be analyzed, a sorrowful scene such as a drama may be extracted, and a thumbnail may be created on the basis of that scene.

In order to play back content on the basis of the recommended content information in FIG. 14, for example, the title 440 of the content is selected and decided using the remote controller 300. Furthermore, the thumbnail may be selected and decided using the remote controller 300, and the content may be played back. In this case, content is played back from the scene corresponding to that thumbnail.

Figure 15:
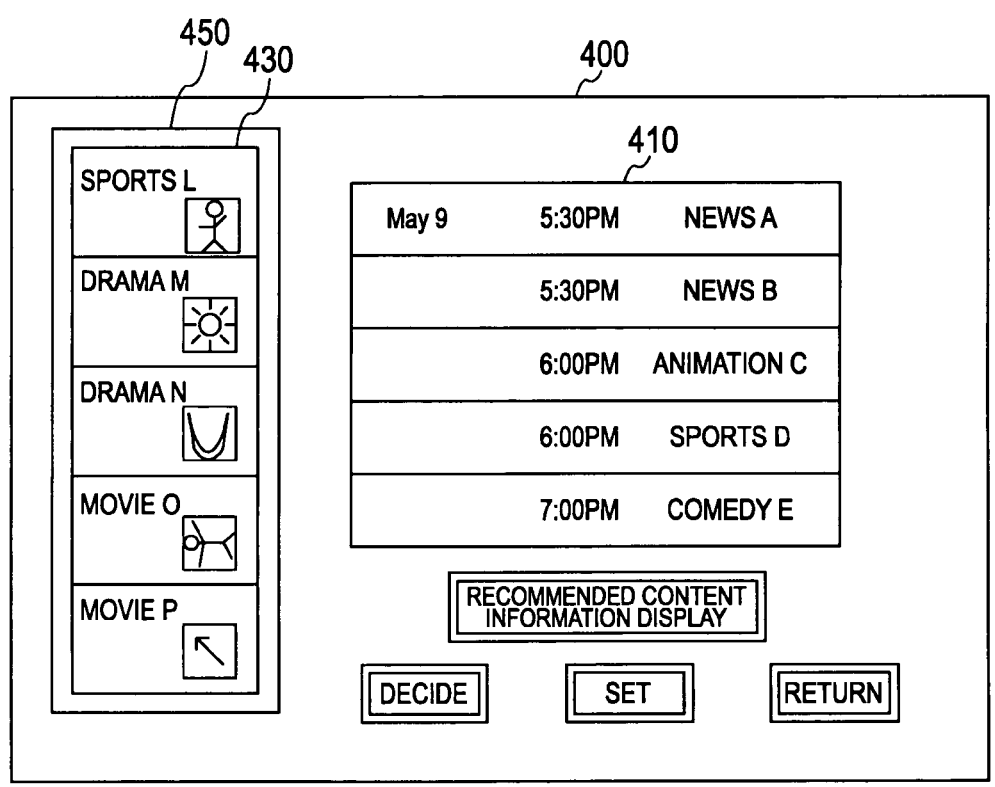
FIG. 15 shows another embodiment of recommended content information on a display screen 400.

FIG. 15 shows another embodiment of the recommended content information on the display screen 400. In the embodiment, on the display screen 400, an apparatus-driven mode area 450 is provided on the left side of the display screen 400. The recommended content information list 430 is displayed in the apparatus-driven mode area 450. At the same time, the content information list 410 is displayed from the center to the right side of the display screen 400. That is, in the embodiment in FIG. 15, content to be displayed in the user-driven mode and content to be displayed in the apparatus-driven mode are displayed at the same time. It is assumed that the recommended content information list 430 in the apparatus-driven mode is displayed in accordance with conditions identical to those described with reference to FIG. 8 to FIG. 12.

FIG. 16 shows a viewing history in the embodiment of the present invention. A viewing history 500 is created by the viewing history creation section 231 described with reference to FIG. 3 and is stored in the viewing history storage section 232. The viewing history 500 indicates the viewing history of the user in the time divided by a date 510 and a time zone 520. "News A" and "news F" indicate that the genre of the content is news. Similarly, "drama D" indicates that the genre of the content is drama. This applies the same for the other content. "(For May 8)" in the "news A (for May 8)" indicates the date and time when "news A" was recorded.

It can be seen from the viewing history of FIG. 16 that, for example, from 18:00 to 20:00 on May 9, the user viewed content specified by "news A (for May 8)" and "drama B (for May 5)". The part of "none" indicates that the user did not view content. On the basis of the viewing history 500, the recommended content information is selected.

In this selection of the recommended content information, for example, content that does not exist in the viewing history 500 within the stored content may be recommended to the user. That is, content that is not yet viewed by the user is made to be recommended content information. When content that is not yet viewed by the user is selected as recommended content information, it may be selected by taking note of a time zone and a genre. In this case, for example the genre of the content that is often viewed by the user in "18:00 to 20:00" in FIG. 16 is news. Therefore, when selecting the recommended content information, information in which the genre of the content is news is selected with priority.

Furthermore, when selecting content that is not yet viewed by the user as recommended content information, the day of the week and the genre may be taken note of. In this case, for example, since the genre of the content that is often viewed by the user on "May 15 (Sunday)" in FIG. 16 is drama, when selecting recommended content information, information in which the genre of the content is drama is selected with priority. The method for selecting the recommended content information on the basis of the viewing history 500 described herein is only an example, and the recommended content information may be selected by taking note of the other points.

Figures 17A, 17B:
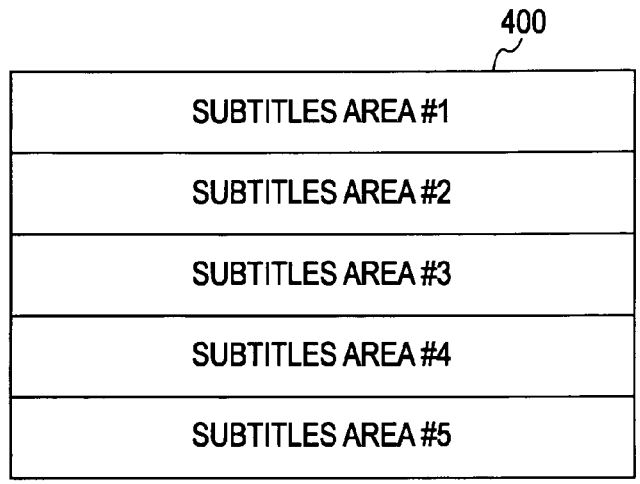
FIGS. 17A and 17B show detection of feature data for subtitles of content.

FIGS. 17A and 17B show detection of feature data for the subtitles of content. In the detection of the subtitles, first, the display screen is divided into several areas. FIG. 17A shows a state in which the display screen 400 is divided into five areas, which are subtitles areas #1 to #5. After the display screen is divided into several areas, a macro block of a predetermined area is taken note of, and the number of edges in that macro block is measured. A predetermined threshold value is set in the number of edges, and when the number of edges exceeds the threshold value, it is determined that subtitles have appeared. It is known that the number of edges can be measured by a method using AC coefficients in MPEG data and by a method such as multiple resolution analysis in wavelet analysis.

FIG. 17B shows an example of feature data for subtitles feature data 530 for subtitles is formed of a start frame number 531 of a feature section in content, an end frame number 532 of the section, a subtitles area number 533 for which detection is to be performed, and the number of macro blocks detected as exceeding the threshold value in the number of edges. The user sets in advance, as predetermined parameters, the following within a fixed range: a start frame number of a feature section in content, an end frame number in the section, a subtitles area number of the subtitles to be detected, and the number of edges detected as exceeding a threshold value in the number of edges. Thus, content within the range of the parameters is assumed as content to be recommended to the user.

Figure 18A:
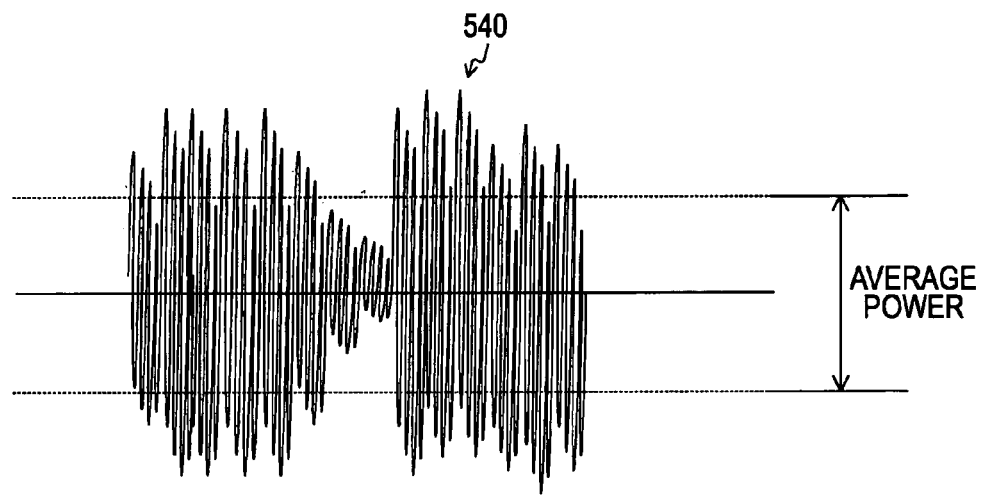
FIGS. 18A and 18B show detection of feature data for audio of content.
Figure 18B:
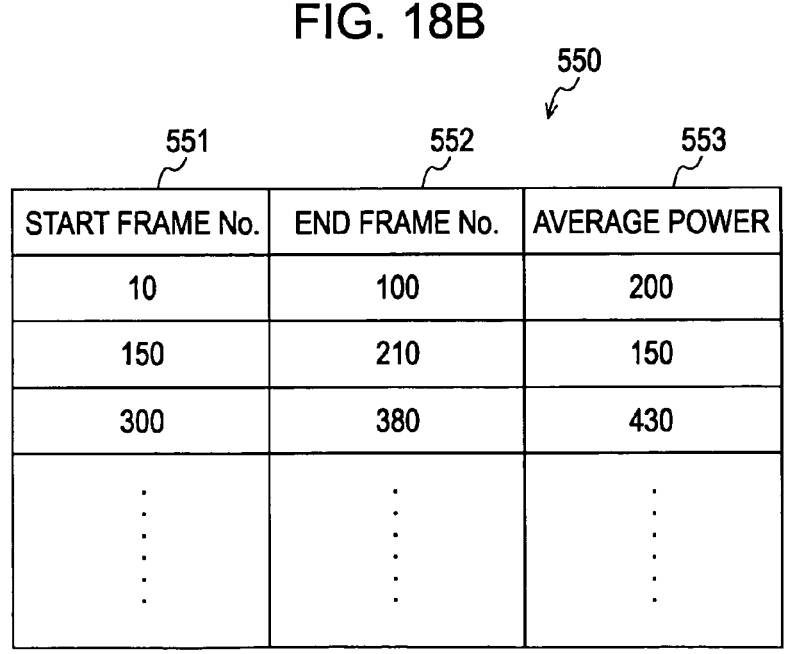

FIGS. 18A and 18B show detection of feature data for audio of content. FIG. 18A shows an example of audio waveform data 540 in a certain section of content. An average value in the amplitude of audio waveform data 550 in a certain section is defined as an average power. FIG. 18B shows an example of feature data for audio, which is formed of a start frame number 551 of a feature section in content, an end frame number 552 of the section, and an average power 553 in which the section from the start frame number 551 to the end frame number 552 is a predetermined section.

The user sets in advance, as predetermined parameters, the following within a fixed range: a start frame number of a feature section in content, an end frame number of the section, and an average power in which the section from the start frame number to the end frame number is a predetermined section. Thus, content within the range of the parameters is assumed to be content to be recommended to the user. In spoken words of people, there are consonants sections, vowel sections, breathing and the like. Therefore, since spoken words have features that the continuity of a section having a predetermined average power or more is short when compared to music or the like, contrivances, such as a predetermined section in parameters being decreased, are made when spoken words of people are used for the feature data.

Next, a description will be given below, with reference to the drawings, of an operation for shifting from the user-driven mode to the apparatus-driven mode and for shifting from an apparatus-driven mode to a user-driven mode.

Figure 19:
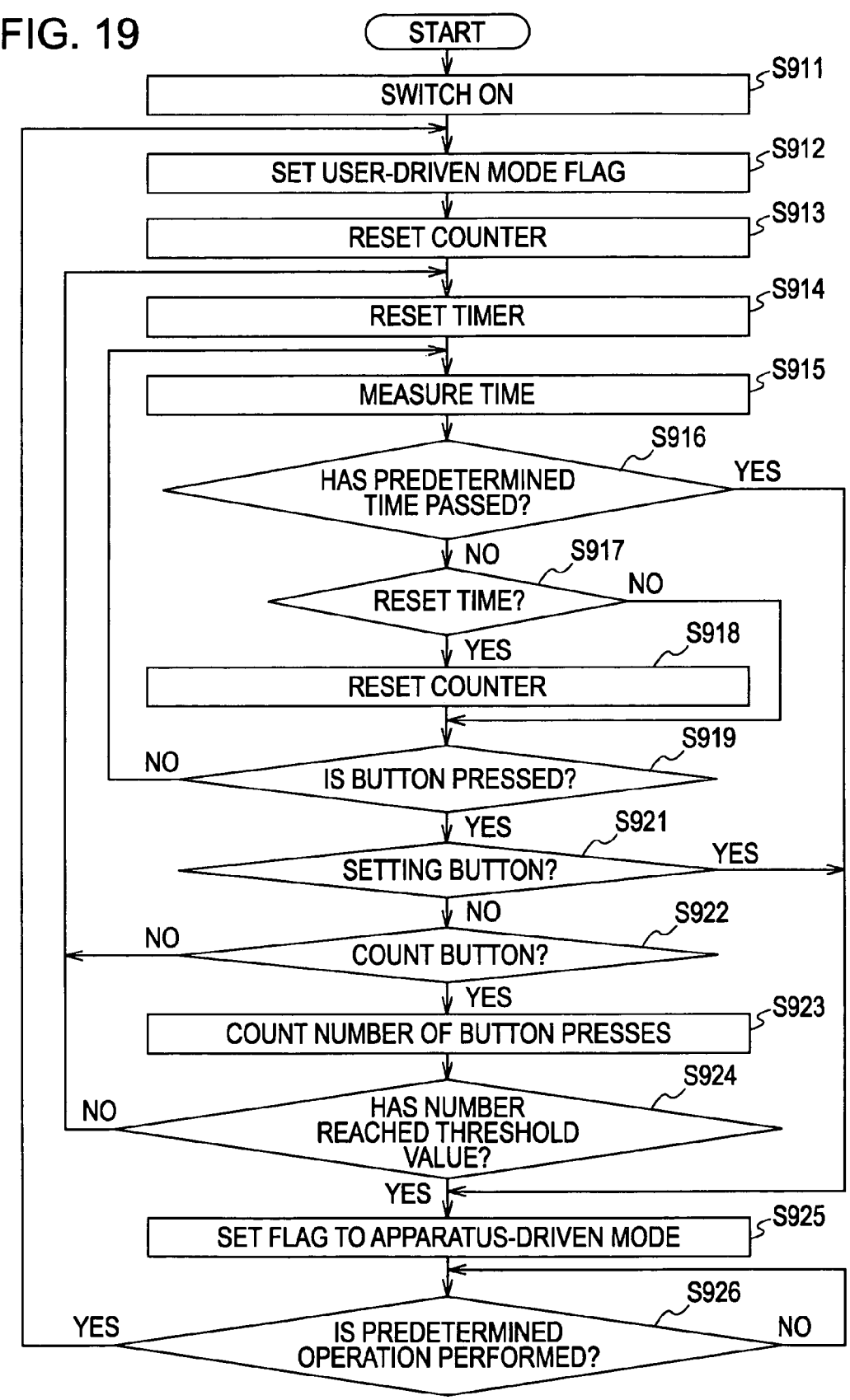
FIG. 19 shows a flow of a shift from the user-driven mode of the information processing apparatus 100 to the apparatus-driven mode thereof and a flow of a shift from the apparatus-driven mode to the user-driven mode in the embodiment of the present invention.

FIG. 19 shows the flow of a shift from the user-driven mode to the apparatus-driven mode in the information processing apparatus 100 and the flow of a shift from the apparatus-driven mode to the user-driven mode thereof in the embodiment of the present invention.

When the power supply of the information processing apparatus 100 is switched on (S911), the flag held in the flag holding section 261 is set to the user-driven mode (S912). A counter of a number-of-playbacks count section 265 or a content information list reference count section 266 of the number-of-operations determination section 264 is reset (S913). Then, a timer in the flag setting timer 268 is reset (S914), and time is measured (S915).

When time is measured using a timer in the flag setting timer 268, it is determined whether or not a predetermined time has passed (S916). When it is determined that a predetermined time has passed, the flag held in the flag holding section 261 is set to the apparatus-driven mode (S925). On the other hand, when it is determined that a predetermined time has not passed, it is determined whether or not the time has reached a reset time at which the counter of the number-of-playbacks count section 265 or the content information list reference count section 266 of the number-of-operations determination section 264 is reset (S917).

When it is determined that the time has reached a reset time at which the counter of the number-of-playbacks count section 265 or the content information list reference count section 266 of the number-of-operations determination section 264 is reset, the counter of the number-of-playbacks count section 265 or the content information list reference count section 266 of the number-of-operations determination section 264 is reset (S918). On the other hand, when it is determined that the time has not reached a reset time, step S918 is skipped.

Next, it is determined whether or not any one of the buttons of the remote controller 300 has been pressed (S919). When it is determined that any one of the buttons of the remote controller 300 has not been pressed, the process returns to step S915, where time measurement is performed again using the timer in the flag setting timer 268. On the other hand, when it is determined that any one of the buttons of the remote controller 300 has been pressed, it is determined whether or not the pressed button is a setting button for directly shifting to the apparatus-driven mode (S921). The setting button for directly shifting to the apparatus-driven mode may be a setting button for directly shifting to the apparatus-driven mode, which is provided in the remote controller 300. When the menu screen is provided with a setting button for directly shifting to the apparatus-driven mode, it is determined whether or not a series of button operations until the setting button is selected and decided has been performed.

When it is determined that the pressed button is a setting button for directly shifting to the apparatus-driven mode, the flag held in the flag holding section 261 is set to the apparatus-driven mode (S925). On the other hand, when it is determined that the pressed button is not a setting button for directly shifting to the apparatus-driven mode, it is determined whether or not the pressed button is a button for allowing the counter of the number-of-playbacks count section 265 or the content information list reference count section 266 of the number-of-operations determination section 264 to perform counting (S922). The button for allowing the counter of the number-of-playbacks count section 265 in the number-of-operations determination section 264 to perform counting is a button for playing back content. For this button, for example, the selection and decision button 318 in the remote controller 300 is assumed. The button for allowing the counter of the content information list reference count section 266 of the number-of-operations determination section 264 to perform counting is a button used to display a content information list of another recording date and time by changing conditions such as the recording date and time in the content information list.

When it is determined that the pressed button is not a button for allowing the counter of the number-of-playbacks count section 265 or the content information list reference count section 266 of the number-of-operations determination section 264 to perform counting, the timer in the flag setting timer 268 is reset (S914). On the other hand, when it is determined that the pressed button is a button for allowing the counter of the number-of-playbacks count section 265 or the content information list reference count section 266 of the number-of-operations determination section 264 to perform counting, the number of button presses is counted by the counter of the number-of-playbacks count section 265 or the content information list reference count section 266 of the number-of-operations determination section 264 (S923).

It is determined whether or not the number of button presses has reached a predetermined threshold value in the counter of the number-of-playbacks count section 265 or the content information list reference count section 266 of the number-of-operations determination section 264 (S924). The number of button presses is determined on the basis of, for example, an operation signal supplied as a result of pressing the button.

When it is determined that the number of button presses has reached the predetermined threshold value in the counter of the number-of-playbacks count section 265 or the content information list reference count section 266 of the number-of-operations determination section 264, the flag held in the flag holding section 261 is set to the apparatus-driven mode (S925). On the other hand, when it is determined that the number of button presses has not reached the predetermined threshold value in the counter of the number-of-playbacks count section 265 or the content information list reference count section 266 of the number-of-operations determination section 264, the timer in the flag setting timer 268 is reset (S914).

When the flag held in the flag holding section 261 is set to the apparatus-driven mode, it is then determined whether or not a predetermined operation has been performed (S926). For the predetermined operation, for example, the pressing of a button other than the selection and decision button 318 in the remote controller 300 or the selection of a menu for shifting from the apparatus-driven mode to the user-driven mode is assumed. In the apparatus-driven mode, when the predetermined operation has not been performed, the state of the apparatus-driven mode continues as is. On the other hand, when a predetermined operation has been performed, the flag held in the flag holding section 261 is set to the user-driven mode (S912).

As described above, according to the embodiments of the present invention, information of broadcast content to be provided to the user from an enormous number of pieces of stored broadcast content is determined and selected by the information processing apparatus, and the selected information of the broadcast content can be provided to the user without causing an unnatural sensation. That is, since the fact that the number of occurrences of operation is large indicates that the user has not found content desired to be viewed, even if recommended content information is provided to the user in such a case, an uncomfortable feeling to be imparted to the user is small. Furthermore, even if recommended content information is presented after a predetermined time has passed, since general users are accustomed to a screen saver, even if the recommended content information is presented at the same timing as that of the screen saver, an uncomfortable feeling to be imparted to the user is small.

The embodiments of the present invention describe examples for embodying the present invention. The embodiments of the present invention have the correspondence with the features of the claims as described below. However, the present invention is not limited to these embodiments. Various modifications can be made within the spirit and scope of the invention.

In the embodiments of the present invention, the content information storage means corresponds to, for example, the content information storage section 211. The content information providing means corresponds to, for example, the content information providing section 212. The recommended content information providing means corresponds to, for example, the recommended content information providing section 250. The operation signal receiving means corresponds to, for example, the operation signal receiving section 280. The content providing means corresponds to, for example, the content providing section 222. The mode holding means corresponds to, for example, the mode holding section 260. The display control means corresponds to, for example, the display control section 270.

In the embodiments of the present invention, the flag holding means corresponds to, for example, the flag holding section 261. The apparatus-driven mode shift determination means corresponds to, for example, the apparatus-driven mode shift determination section 262. The user-driven mode shift determination means corresponds to, for example, the user-driven mode shift determination section 267.

In the embodiments of the present invention, the flag holding means corresponds to, for example, the flag holding section 261. The flag setting timer corresponds to, for example, the flag setting timer 268.

In the embodiments of the present invention, the recommended content information selection means corresponds to, for example, the recommended content information selection section 251. The recommended content information storage means corresponds to, for example, the recommended content information storage section 252. The recommended content information processing means corresponds to, for example, the recommended content information processing section 254.

In the embodiments of the present invention, the information update report means corresponds to, for example, the information update report section 253.

In the embodiments of the present invention, the content information storage means corresponds to, for example, the content information storage section 211. The content information providing means corresponds to, for example, the content information providing section 212. The recommended content information providing means corresponds to, for example, the recommended content information providing section 250. The operation means corresponds to, for example, the operation signal receiving section 280 and the operation section 290. The content providing means corresponds to, for example, the content providing section 222. The mode holding means corresponds to, for example, the mode holding section 260. The display control means corresponds to, for example, the display control section 270.

In the embodiments of the present invention, the flag holding means corresponds to, for example, the flag holding section 261. The apparatus-driven mode shift determination means corresponds to, for example, the apparatus-driven mode shift determination section 262. The user-driven mode shift determination means corresponds to, for example, the user-driven mode shift determination section 267.

In the embodiments of the present invention, the content holding means corresponds to, for example, the content storage section 221. The content information storage means corresponds to, for example, the content information storage section 211. The content information providing means corresponds to, for example, the content information providing section 212. The recommended content information providing means corresponds to, for example, the recommended content information providing section 250. The operation signal receiving means corresponds to, for example, the operation signal receiving section 280. The content providing means corresponds to, for example, the content providing section 222. The mode holding means corresponds to, for example, the mode holding section 260. The display control means corresponds to, for example, the display control section 270.

In the embodiments of the present invention, the operation signal receiving means corresponds to, for example, the operation signal receiving section 280. The mode holding means corresponds to, for example, the mode holding section 260. The no-operation time determination step corresponds to, for example, step S914, step S915, step S916, or step S919. The apparatus-driven mode setting step corresponds to, for example, step S925. The operation signal determination step corresponds to, for example, step S926. The user-driven mode setting step corresponds to, for example, step S912.

In the embodiments of the present invention, the operation signal receiving means corresponds to, for example, the operation signal receiving section 280. The mode holding means corresponds to, for example, the mode holding section 260. The number-of-occurrences determination step corresponds to, for example, step S913, step S917, step S922, step S923, or step S924. The apparatus-driven mode setting step corresponds to, for example, step S925. The operation signal determination step corresponds to, for example, step S926. The user-driven mode setting step corresponds to, for example, step S912.

In the embodiments of the present invention, the operation signal receiving means corresponds to, for example, the operation signal receiving section 280. The mode holding means corresponds to, for example, the mode holding section 260. The no-operation time determination step corresponds to, for example, step S914, step S915, step S916, or step S919. The apparatus-driven mode setting step corresponds to, for example, step S925. The operation signal determination step corresponds to, for example, step S926. The user-driven mode setting step corresponds to, for example, step S912.

In the embodiments of the present invention, the operation signal receiving means corresponds to, for example, the operation signal receiving section 280. The mode holding means corresponds to, for example, the mode holding section 260. The number-of-occurrences determination step corresponds to, for example, step S913, step S917, step S922, step S923, or step S924. The apparatus-driven mode setting step corresponds to, for example, step S925. The operation signal determination step corresponds to, for example, step S926. The user-driven mode setting step corresponds to, for example, step S912.

The processing steps described in the embodiments of the present invention may be considered as a method including the series of steps, or a program for enabling a computer to execute the series of steps, or a recording medium storing the program.

The invention claimed is:

1. An information processing apparatus comprising:
    content information storage means for storing content information for specifying content;
    content information providing means for providing the content information;
    recommended content information providing means for selecting, as recommended content information, content information of the content to be recommended from the content information storage means in accordance with predetermined conditions and for providing the recommended content information;
    operation signal receiving means for receiving an operation signal for information processing apparatus;
    content providing means for obtaining and providing content corresponding to the content information or content corresponding to the recommended content information in response to the operation signal;
    mode holding means for, in response to the operation signal, holding information indicating which one of a user-driven mode for selecting the content on the basis of the content information and an apparatus-driven mode for selecting the content on the basis of the recommended content information an operation mode is set to; and
    display control means for controlling display of the content information, the recommended content information, or the content provided from the content providing means on the basis of information about the mode,
    wherein when an operation signal is received indicating that a content list is to be displayed, the apparatus displays a screen including the content list, a recommended content information display button and, when the recommended content information is updated, an indication that the recommended content information is updated,
    wherein when the screen including the content list is displayed for a predetermined period of time during which no operation is performed by the user, the apparatus automatically switches from the user-driven mode to the apparatus-driven mode and automatically displays a recommended content information list in place of the content list, the recommended content information list having a format different from the format of the content list.

2. The information processing apparatus according to claim 1, wherein the display control means displays the content information or the content in the case of the user-driven mode and displays the recommended content information in the case of the apparatus-driven mode.

* * * * *